United States Patent [19]
Wagner et al.

[11] Patent Number: 6,002,395
[45] Date of Patent: *Dec. 14, 1999

[54] SYSTEM AND METHOD FOR BUILDING, TESTING AND INTEGRATING A GRAPHICAL TOUCH USER INTERFACE

[75] Inventors: Samuel J. Wagner, Lilburn; Gary R. Young, Dunwoody, both of Ga.

[73] Assignee: NCR Corporation, Dayton, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/742,004

[22] Filed: Oct. 31, 1996

[51] Int. Cl.⁶ .................................................... G06F 3/00
[52] U.S. Cl. ............................ 345/333; 345/335; 345/173
[58] Field of Search .................................. 345/333, 334, 345/335, 348, 339, 967

[56] References Cited

U.S. PATENT DOCUMENTS

| | | | |
|---|---|---|---|
| 5,121,477 | 6/1992 | Koopman et al. | 345/333 |
| 5,163,130 | 11/1992 | Hullot | 345/334 |
| 5,297,250 | 3/1994 | Leroy et al. | 345/333 |
| 5,347,629 | 9/1994 | Barrett et al. | 345/334 |
| 5,533,184 | 7/1996 | Malcolm | 345/333 |
| 5,600,778 | 2/1997 | Swanson et al. | 345/333 |
| 5,642,511 | 6/1997 | Chow et al. | 345/967 X |
| 5,652,850 | 7/1997 | Hollander | 345/333 |
| 5,764,226 | 6/1998 | Consolatti et al. | 345/333 |

*Primary Examiner*—Raymond J. Bayerl
*Assistant Examiner*—Chadwick A. Jackson
*Attorney, Agent, or Firm*—Needle & Rosenberg

[57] ABSTRACT

A builder, tester, and runtime integration system and method for a graphical touch user interface, such as a point-of-sale (POS) touch screen interface system, is provided. The system and method may include a builder tool to create and modify the graphical interface, a tester tool for testing the interface, and a run-time system for actually executing the interface logic. Because the interface may be designed, modified and tested external to the run-time system, the design and maintenance may be performed by a non-programmer without ever changing run-time code. Additionally, the builder and tester may be designed to be general-purpose, and the run-time code may be reusable.

21 Claims, 30 Drawing Sheets

FIG. 2A

NICE CONTROL EXAMPLES (TOUCH): PIZZA, PIZZAS, SPECIAL PEPPERONI, AS A MEAL, GUEST CHECK #1

PIZZA
- PIZZAS (211-1)
- SPECIAL PEPPERONI (211-2)
- SPECIAL DELUX (211-3)
- SPECIAL VEGGIE (211-4)

OTHER
- SPAGHETTI
- SANDWICHES
- KIDS MEAL
- MISC

GUEST CHECK #1 (203)
- 231-1
- 231-2

APPETIZERS
- GARLIC BREAD W/CHEESE
- BREADSTICKS

DRINKS
- SMALL SODA
- ICED TEA
- MEDIUM SODA
- MILK
- LARGE SODA
- COFFEE
- PITCHER SODA
- BEER 221-1 TO 221-8

SALADS
- AS A MEAL (213-1)
- W/MEAL (213-2)

BALANCE $ 0.00

- MODIFY ITEM
- CHANGE QUANTITY
- REMOVE ITEM
- END ORDER
- INDIVIDUAL TOTAL
- CANCEL ORDER 241-1 TO 241-6

NICE CONTROL EXAMPLES (TOUCH): CASH, $0.82, $1.00, $5.00, $10.00, $20.00, KEYPAD, EDIT BOX

FIG. 2B

1301 — PIZZA
1301-2 — STYLE: WS_BORDER
WINDOW: 0 0 218 240
COLOR: 254 167 146
FONT: 24
TEXT: 15
JUSTIFY: C
LINE: 0
EXPLICIT_ENABLE: y
ENABLE: n

FIG. 3A

1302 — PIZZAS
TITLE: 16
STYLE: MFBS_CTRIANGLE
1302-3 — WINDOW: 1 105 101 64
ENTRY: y
FUNCTION1: 80 PIZZA1
DESTROY1: 3 7 8 4 5 -1
CREATE1: 11 14 -1
ENABLE: y

1303 — SPECIAL PEPPERONI
TITLE: 17
STYLE: MFBS_LOVAL | MFSB_RTRIANGLE
WINDOW: 117 34 101 64
ENTRY: y
FUNCTION1: 75 SPECIAL_PEPPERONI1
DESTROY1: 8 -1
CREATE: 7 -1
FUNCTION2: 76 SPECIAL_PEPPERONI2
DESTROY2: 3 7 8 4 5 -1
CREATE2: 11 12 -1
ENABLE: y

1304 — AS A MEAL
TITLE: 24
STYLE: GPBS_TXTBELOW
1304-3 — ICON: SALAD_C
WINDOW: 1 414 101 64
ENTRY: y
FUNCTION1: 92 SALAD_AS_A_MEAL
DESTROY1: 8 -1
CREATE1: 7 -1
ENABLE: y

1305 — GUEST CHECK #1
BLACKBOARD: 23 RECEIPT1
TITLE: 31
STYLE: WS_CAPTION | RECEIPT_WNDSTYLE | RCS_ITEMSEPERATORS |
    RCS_SCROLLITEM | RCS_NOTIFY | RCS_ITEMSELECTOR
WINDOW: 437 0 199 214
COLOR: 255 255 255
ENABLE: y

NICE CONTROL EXAMPLES (LANGUAGE): PIZZA, PIZZAS, SPECIAL PEPPERONI, AS A MEAL, GUEST CHECK #1

FIG. 3B

1311 — CASH, $0.82, $1.00, $5.00, $10.00, $20.00
BLACKBOARD: 4 CASH_FLEX_BAR
TITLE: 138
STYLE: FBS_TOGGLE I FBS_MUTEX I FBS_6BUTTON
WINDOW: 8 48 437 64
COLOR: 137 209 140
1311-6 — ENTRY: y
1311-7 — FUNCTION1: 39 FLEX_CASH_SPECIAL1
1311-8 — DESTROY1: 21 22 23 -1
1311-9 — CREATE1: 27 -1
FUNCTION2: 58 FLEX_TENDER_CASH26
DESTROY2: 21 22 23 -1
CREATE2: 27 -1
FUNCTION3: 58 FLEX_TENDER_CASH26
DESTROY3: 21 22 23 -1
CREATE3: 27 -1
FUNCTION4: 58 FLEX_TENDER_CASH26
DESTROY4: 21 22 23 -1
CREATE4: 27 -1
FUNCTION5: 58 FLEX_TENDER_CASH26
DESTROY5: 21 22 23 -1
CREATE5: 27 -1
FUNCTION6: 58 FLEX_TENDER_CASH26
DESTROY6: 21 22 23 -1
CREATE6: 27 -1
ENABLE: y

1312 — KEYPAD
STYLE: KPS_NUMCALCCE
WINDOW: 84 233 269 240
LENGTH: 7
MAPPING: y
ENTRY: y
FUNCTION1: 125 TENDER_KEYPAD1
EXPLICIT_ENABLE: y
ENABLE: y

1313 — EDIT BOX
STYLE: EBS_NUMERIC I EBS_CARETOFF I EBS_RIGHT I EBS_MONETARY
WINDOW: 260 209 91 25
COLOR: 255 255 255
FONT: 24
FOCUS: y
LENGTH: 7
EXPLICIT_ENABLE: y
ENABLE: y

NICE CONTROL EXAMPLES (LANGUAGE): CASH, $0.82, $1.00, $5.00, $10.00, $20.00, KEYPAD, EDIT BOX

FIG. 3C

CASH DRAWER
STYLE: ECDS_RIGHTTOLEFT I ECDS_ACTIVE I ECDS_SOUNDON
WINDOW: 111 64 404 304
ENABLE: n

PEPPERONI
BLACKBOARD: 41 TOPPING01
TITLE: 75
STYLE: MFBS_LPLAIN I MFBS_CPLAIN I MFBS_RPLAIN
ICON: PEPPZA_C
WINDOW: 8 219 142 71
ENTRY: y
FUNCTION1: 132 TOPPING_LEFT1
FUNCTION2: 131 TOPPING_CENTER2
FUNCTION3: 133 TOPPING_RIGHT3
ENABLE: y

NICE CONTROL EXAMPLES (TOUCH): CASH DRAWER, PEPPERONI

SYSTEM AND METHOD FOR BUILDING, TESTING AND INTEGRATING A GRAPHICAL TOUCH USER INTERFACE

BACKGROUND OF THE INVENTION

1. Field of the Invention

The present invention generally relates to the building, testing and integration of graphical user interfaces (GUI), and in one embodiment to a touch screen point-of-sale (POS) whereby the interface design, testing and maintenance is performed external to run-time code.

2. Description of the Prior Art

In recent years, touch screen devices have become commonplace in a variety of environments. For example, touch screen devices have been used in point-of-sale (POS) applications, such as in a retail establishment Within certain types of retail establishments, such as "fast food" restaurants, touch screen POS devices have become quite advantageous, given their ease of use and flexibility.

Superior interfaces are required in many cases to ensure that different types of users of touch screen interfaces can easily use these systems. Accordingly, many of these interfaces are now designed by human interface (HI) engineers, who have training in the design of human-machine interfaces, but who may or may not have an in-depth knowledge of computer programming. Moreover, it may be most efficient for a human interface engineer to not waste time performing software programming work, but rather to concentrate on his or her area of expertise. The problem then arises as to how an interface designed by an HI engineer is best communicated to customers (for approval of the design) and to software engineers (for implementation and testing of the design).

One current approach is to have HI engineers use a presentation tool like Microsoft® PowerPoint® to design and layout the graphical user interface. The problem, of course, is that this work does not contribute directly to the final interface. In other words, after an HI engineer has designed the interface, a programmer must then take the design and then start programming. Furthermore, as with any design, there will be design iterations that further compound the problem.

A better approach would be to have an HI engineer use a builder tool that utilizes graphical windows, menus, dialogs, and a common set of control names to build the user interface. A non-programmer could build the interface accurately and quickly. Then, this actual external interface would be read by a skeleton, runtime system that has just a few dummy entry level logic functions defined. The result would be that an HI engineer could very quickly get feedback on how the interface will actually look-and-feel. Also, the HI engineer would have the capability to correct errors and make improvements as the interface is fine-tuned.

Further, by providing a general-purpose tester program, the HI engineer would have another way to judge the design by watching the system run as if a human were pressing the various buttons. Should they have inadvertently forgotten to build a particular screen, then the tester would inform them of the mistake, and the HI engineer could again use the builder tool to correct the problem. Software programming personnel could also use the tester to ensure that the proper entry level logic functions are specified. Finally, when touch screen systems are deployed, it may be desirable to modify the user interface without changing the run-time interface. For example, a user might want to change a button's position, an object's color, some object text, etc.

Therefore, there is a need in the art for a system and method for building, testing, and integrating a touch screen interface into a runtime system that is simpler and less expensive than the systems and methods of the prior art, is more accurate in progressing from design to implementation, and enables non-programming personnel to do a significant amount of the design and maintenance work

SUMMARY OF THE INVENTION

A builder, tester, and runtime integration system and method for a graphical touch user interface, such as a point-of-sale (POS) touch screen interface system, is provided. The system and method may include a builder tool to create and modify the graphical interface, a tester tool for testing the interface, and a run-time system for actually executing the interface logic. Because the interface may be designed, modified and tested external to the run-time system, the design and maintenance may be performed by a non-programmer without ever changing run-time code. Additionally, the builder and tester may be designed to be general-purpose, and the run-time code may be reusable.

In one embodiment, the system and method of building or creating a graphical user interface, such as a POS touch screen interface, may include the steps of choosing, one-at-a-time, the "controls" that comprise a screen, accessing the menu items and their dialogs to gather the control's information, and saving the dialog information into the object's "slots". This process may be repeated for each new screen.

The system and method of testing the interface may begin by "painting" the screens that comprise the first touch screen display. The button controls appearing on the first display may have their logic information placed in a stack structure so that the first button's data is on the top of the stack. Then, the stack is popped and its pertinent logical information is placed in a popup window for a few seconds. Branching then may take place and the new screens' button information is placed on top of the stack, and the top item is again popped off the stack. The process continues until all the branching has been done. If a particular screen is ever redisplayed, then none of its button data is placed on the stack a second time. If a screen number does not exist, then its number is placed in a popup window along with an error message. The tester can be paused at anytime by pressing the space bar, and can be terminated by pressing a digit key.

The system and method of integrating the external graphical interface into a runtime system may begin by performing a series of steps that read and store the interface into program structures in memory. Next, the first screen is painted by creating each of the child windows (objects) using the slot information to formulate the necessary window commands to cause the object to be displayed properly. Next, a series of steps that map the interface function code to the execution of the right function within the run-time code may be performed. Finally, the series of steps that manage the displaying of the new touch screen display may be performed.

The present invention provides a highly efficient system and method for designing, testing and integrating a graphical interface as human interface engineers and software programmers may work in parallel to create the actual external interface. Additionally, most of the interface design, implementation and maintenance can be performed using menus and dialogs within the familiar Windows environment.

BRIEF DESCRIPTION OF THE FIGURES OF THE DRAWINGS

FIGS. 2A–2D depict sample graphical displays illustrating various objects integrated in a POS touch screen system.

FIGS. 3A–3C illustrate pertinent external interface language slots names and their respective data for the objects shown in FIGS. 2A–2D.

DETAILED DESCRIPTION OF THE INVENTION

Figure 1A:
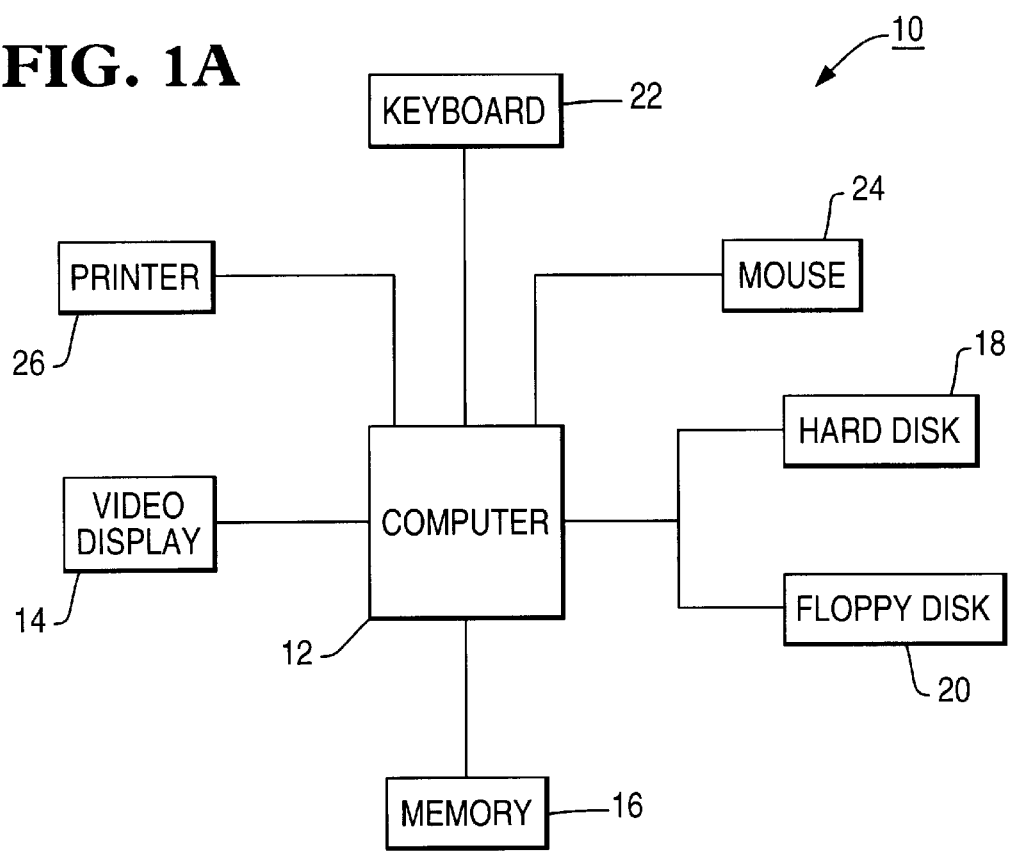
FIGS. 1A and 1B are block diagrams depicting examples of a developmental system and a POS touch screen system in accordance with the teachings of the present invention.

Referring now to FIG. 1A, system 10 is used for building, maintaining, and testing the external interface. It includes computer 12, video display (CRT) 14, memory 16, hard disk 18, floppy disk 20, keyboard 22, mouse 24, and printer 26.

In a preferred embodiment, system 10 may be a typical PC developmental system, whereby computer 12 is an Intel® 486 or Pentium® computer, video display 14 is a VGA monitor, memory 16 comprises at least 16 MB of RAM, hard disk 18 has a capacity of at least 1.2 GB of secondary storage, floppy disk 20 is a 3.5" flex disks, keyboard 22 is a common PC keyboard, mouse 24 is a Microsoft® mouse or equivalent, and printer 26 is a laser or ink jet printer that is PC compatible.

Figure 1B:
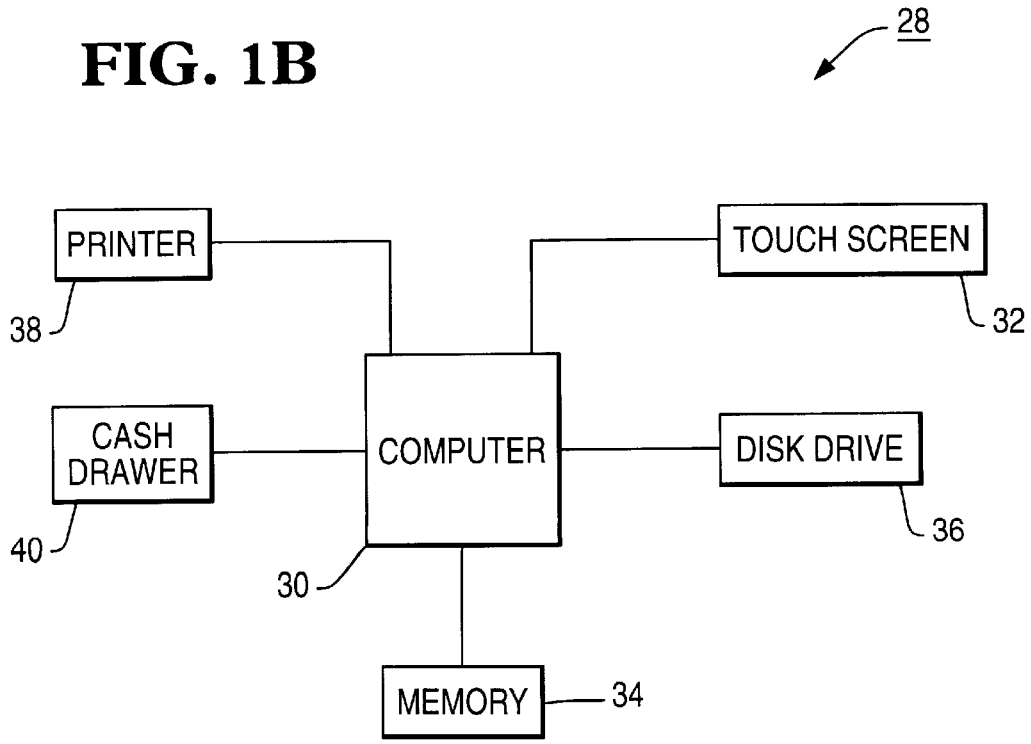

Referring now to FIG. 1B, system 28 may be a point-of-sale (POS) system and may include computer 30, touch screen 32, memory 34, disk 36, printer 38, and cash drawer 40.

In a preferred embodiment, system 28 may be a touch screen system used in a retail environment. Computer 30 may be an NCR 7450 PC or it can be an ordinary Intel-based PC, touch screen 32 is a 10-inch NCR Touch Screen or one from another vender, memory 34 may comprise 16 MB of RAM or more, disk 36 is optional and may be at least 500 MB of secondary storage, printer 38 may be an NCR printer or equivalent, and cash drawer 40 may be an NCR cash drawer or equivalent.

The present invention will now be described in further detail below. In describing the present invention, reference is made to a sample application for the teachings of the invention—namely, a point-of-sale touch screen retail system for use within a restaurant, such as a pizzeria. Of course, it will be readily recognized that this is merely a sample application, and the present invention can be used in various other environments as well.

1. The Builder Tool

In FIGS. 5A-1, 5A-2, and 5B through 5L, the builder tool (hereinafter also referred to as <B>) is used to build a new or modify an existing touch screen interface. The builder tool <B> may be implemented by programming computer 12 using any one of a variety of programming languages, such as Microsoft C/C++.

As mentioned previously, the interface is external to the run-time system (described later) and in one embodiment may consist of two ASCII files. The first file is the main file and makes use of a frame-like language with screen frames and child frames. Each screen is begun with a "begin_screen:i" line, where the value of "i" is the screen number. Likewise, each screen ends when the "end_screen:i" entry is found.

In a preferred embodiment, within each screen frame are one or more "NICE" object frames given in sequential order. The NCR NICE® (Natural Interface for Computing Environments) product is a library of run-time application building blocks for use with PC and PC-compatible workstations running in a Microsoft® Windows™ environment. NICE Client is a version of NICE for systems operating under Microsoft Windows 3.1 (and up). NICE Client provides the application developer with a set of user interface objects appropriate for use in a touch screen environment.

The first line is an object definition that begins with a "begin_child:i type" line and is terminated with an "end_child:i type" entry. Here "i" is the relative child number within a screen and "type" is the NICE classification. For example, in FIG. 3A, the "Pizza" control is associated with a NICE "Reply Box", and the type for this control is "ncReplyBox". Between the begin-end pair of object statements are slots that give the child information. Each slot occupies one line and is denoted by a slot name followed by a colon. For example, in FIG. 3A, the first slot for the "Pizza" control is the "style" slot The second interface file is directly related to the first interface file. For example, in FIG. 3A notice the "text:15" slot information for "Pizza". The number 15 indicates the 15th entry in the second file will contain the text "Pizza". Thus, the number 15 is a pointer into the second file.

FIG. 2A depicts an actual user interface that is displayed on video display 14 based upon the NICE controls of FIGS. 3A–3C (as well as other controls not shown). Control 211-5 in FIG. 2A corresponds to the Pizza control shown in FIG. 3A. Because of the "text:15" slot for the Pizza control in FIG. 3A, the 15th entry in the second file (e.g., the text "Pizza") is displayed for control 211-5 in FIG. 2A. In short, the second file contains one line for each text unit needed by the controls defined in the first file.

Importantly, each touch screen display 32, such as those depicted in FIGS. 2A–2D, may have multiple screens as just defined. For example, in FIG. 2A, the display has four screens. The first screen 201 includes the "Pizza" 211, "Appetizer" 212, "Salads" 213, and "Other" 214 units. A unit is defined to consist of one or more NICE objects. For example, the "Pizza" unit 211 has four button objects 211-1, 211-2, 211-3 and 211-4, and these controls are placed on top of another background object 211-5. This latter object 211-5 is the one with a background color which contains the text "Pizza".

The second screen 202 is the "Drinks" unit 221, which contains eight buttons 221-1 through 221-8. The third screen 203 is the one having the title "Guest Check #1" and the "balance" line. The fourth screen 204 is in the lower right-hand corner of FIG. 2A where the six buttons 241-1 through 241-6 are placed on a colored background.

The choice of multiple screens for a touch screen display 32 is useful when the pressing of a button control causes only part of the display to be destroyed. For example, again referring to the touch screen example in FIG. 2A, if the "Beer" button is pressed, then only the "Drinks" screen 202 needs to be deleted and replaced. The other three screens 201, 203 and 204 remain. Thus, when the touch screen display 32 is built using the builder tool <B>, a decision may be made whether to have one or more screens.

Referring again to the flowcharts in FIGS. 5A-1, 5A-2, and 5B through 5L, the builder tool may be executed by a suitably programmed computer 12, as will be recognized by a person of ordinary skill in the art. The builder tool's <B> execution starts at block 100 and then continues to block 102 where an inquiry is made to decide whether to create a new interface or open an existing one. The implementation for the inquiry may be performed by constructing a Windows File Menu with "New" and "Open" selections, as is standard Windows programming practice.

If in block 102 the result of the inquiry is "yes", meaning a new interface is to be created, then blocks 104 through 110 are sequentially executed. First, in block 104, the new interface prefix name is set to "autopos1", so later the two interface files, described previously, saved to disk 18 will be named "autopos1.frm" and "autopos1.dat" respectively. The ".frm" suffix is chosen because it denotes the file is an Artificial Intelligence, frame-like language where various slots are used to store information. The ".dat" suffix indicates the file contains data, and in this case the data will be text data.

Continuing, block 106 is executed next and the two supporting files are opened. The first contains the ELL function names, and the second contains the "blackboard" names. The use of these files is explained later. The execution of block 108 follows and causes the supporting files to be read and the respective record contents are stored in two arrays. Finally, the preliminary work in creating a new interface is finished with the execution of block 110. In this block the variables "iScreenNum", "iChildNum", and "iNumScreens" are initialized. That is, the first screen in the interface and first child number in that screen are initialized to one and the total number of screens is set to zero.

In block 110 the choice for a new object is also made. The selection is made by choosing from, for example, a Choose Menu for one of the ten NICE objects. The choices are "Reply", "GPB", "MFBN1", "MFBN2", "MFBN3", "Flex Bar", "Receipt", "Edit Box", "Numeric Keypad", or "Change Display". At this point, the video display 14 is still blank and the builder tool <B> is now ready to begin the work involved in creating a specific NICE object by branching to connector H in FIG. 5G. Before discussing this logic, reference is again made to block 102.

If the result of the inquiry at block 102 is "no", then an existing interface is to be modified and the preliminary logic steps are given in blocks 112 through 118. First, the execution of block 112 results in the proper interface ".frm" file being selected. The block is implemented by having the user select, for example, an "Open" menu item from the File Menu. Then, by using a Windows common file dialog approach one can easily select from all the existing ".frm" files that reside in a specific directory on disk. Continuing, program execution proceeds to block 114 where the two interface files and the two supporting files are opened. Next, control passes to block 116 where all the input record information is read and stored into various arrays. Then, the execution of block 118 causes the initial touch screen display 32 to be painted by using the stored interface screen and child information in conjunction with pertinent Windows commands. The beginning line in the ".frm" interface file is used to determine the screens that will comprise the first Touch Screen display.

Figures 1, 5A:
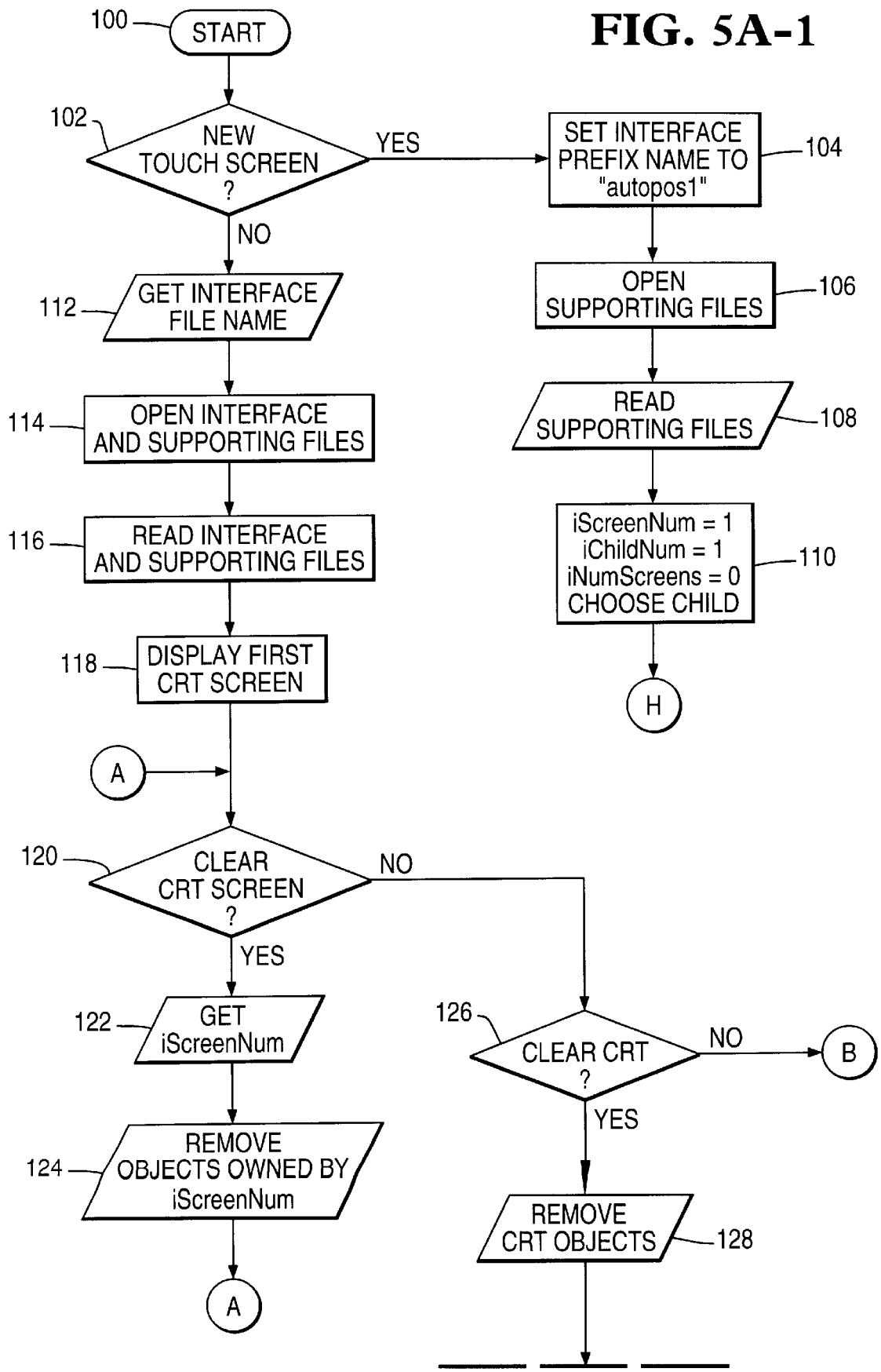
FIGS. 5A-1, 5A-2, and 5B–5L are flowcharts depicting the steps that may be performed when building an external touch screen interface.

Following the preliminary steps associated with modifying an existing file, the loop beginning at block 120, and pointed to by the connector A in FIG. 5A-1, is encountered. The purpose of the loop is to first remove from the video display 14 any screens not needed during a particular modification.

When block 120 is executed, an inquiry is made to see if, for example, a "Screens" menu item has been chosen from the Clear Menu. If the answer is "yes", then block 122 is executed next. The input specified in block 122 is obtained by using a dialog to place the screen number into the variable "iScreenNum". Then, this screen's objects will be removed from the video display 14. Block 124 is executed next and actually removes the designated screen objects from the video display 14. A branch is then made back to the start of the loop at block 120 to inquire if more screens are to be deleted. In summary, therefore, the loop 120–124 allows for a subset of screens to be removed from the video display 14 before maintenance is ever begun (described further below).

Referring again back to block 120, suppose the traversal of the loop at connector A is finished or simply is not to be used. Then, the result of the inquiry of block 120 is "no", and execution of block 126 is performed next. Again, another inquiry is made. But this time the question is whether or not to clear the entire video display 14 screen. This is very useful as it avoids clearing the video display 14 one screen at a time if all the current screens are to be removed. There are two reasons for removing all video display 14 objects. First, if a new screen of objects is to be constructed, then at the outset the video display 14 must be blank. Second, if an existing screen or object is to be modified, then it is best to clear the video display if the display is the wrong one before adding one or more different screens. The implementation of the inquiry at block 126 and the subsequent clearing of the video display is performed by choosing, for example, an "Active" menu item from the Clear Menu, according to standard Windows programming practice.

Continuing, if the answer to block 126's inquiry is "yes", then the program transfer is to block 128. The execution of block 128 causes the video display 14 to be made blank. At this point, it is unknown whether the video display 14 will be left blank or other screens will be added so they can be modified. Therefore, when block 130 is executed the video display 14 is still blank, so the assumption is that a new screen is to be constructed. In preparation for this, the execution of block 130 sets the "iScreenNum" variable to the expression "iNumScreens+1", and the "iChildNum" variable is initialed to one. In short, the new screen number value will be one higher than the last screen number built, and the first child number in that screen will have a value of 1. On the other hand, if the result of the inquiry at block 126 is "no", then blocks 128 and 130 are bypassed.

The program now is ready to execute block 132. But blocks 132 through 136 constitute a loop that is pointed to by connector B in FIG. 5A-2. The purpose of this loop is to add more screens, if necessary, to the video display 14. Once the loop is finished, then one might choose to branch to the beginning of the loop pointed to by connector A in FIG. 5A-2. Thus, the selection process is started again if screen selection mistakes have been made. Or if the video display 14 screen is still blank, then the construction of a new screen and its objects can begin in FIG. 5G once the first new NICE child type is chosen. Or if the video display 14 is not blank, then control will be to the start of the modification algorithm depicted in FIG. 5B.

Figures 2, 5A:
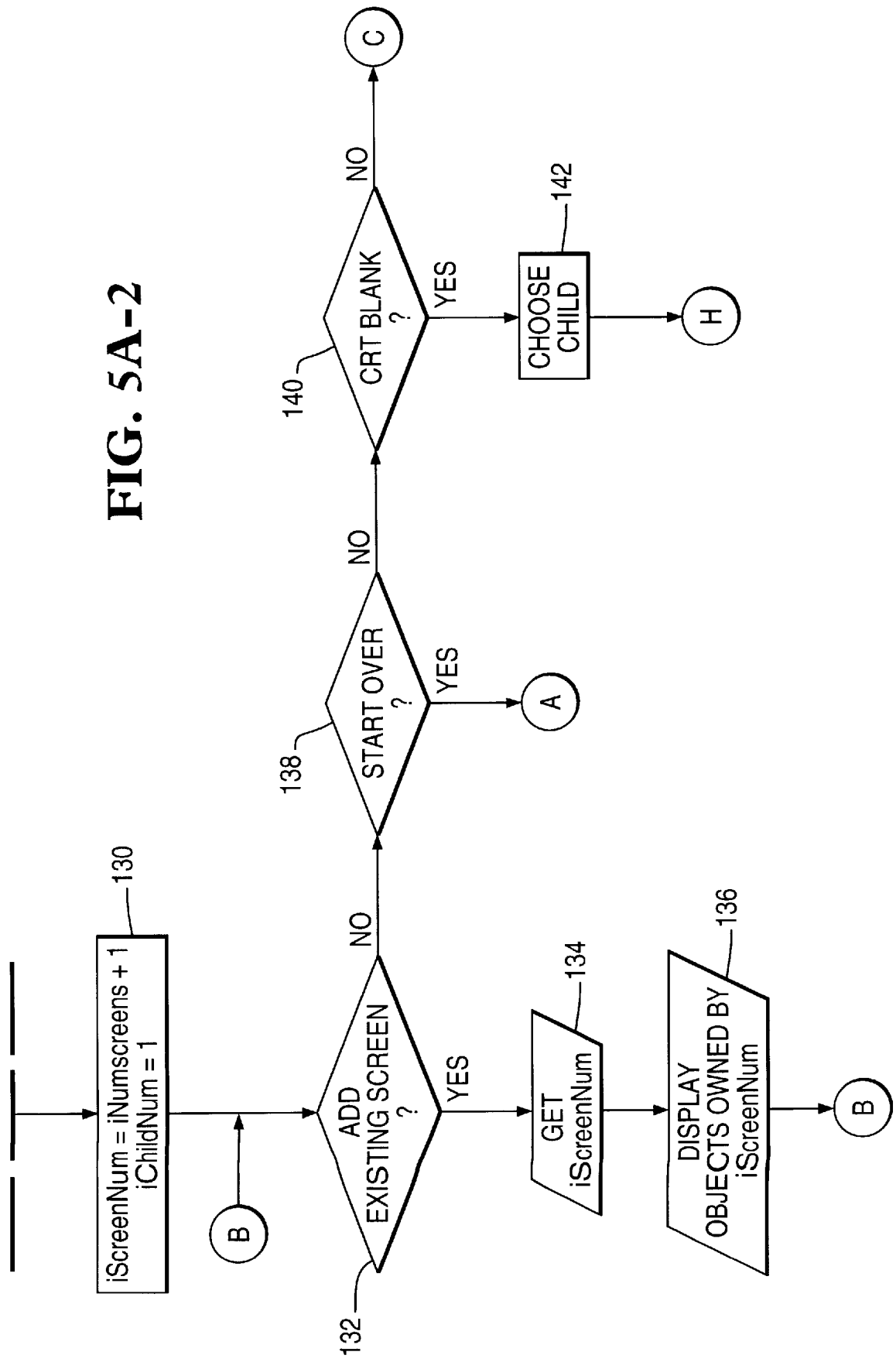

Beginning at connector B in FIG. 5A-2, if the result of the inquiry at block 132 is "yes", then program control goes to block 134. Here, a dialog is used to place in the "iScreenNum" variable the number of the screen whose objects are to be added to the video display 14. Next, block 136 is executed and the objects owned by "iScreenNum" are displayed on the video display 14. Transfer is then made to the beginning of the loop again at block 132. If the result of the inquiry in block 132 is "no", then the loop is terminated and block 138 is executed. If the result of this inquiry is "yes", then control is transferred back to connector A. If the result of this inquiry is no, then block 140 is executed. The inquiry at block 140 is used to determine if the video display 14 is still blank. If the result of this inquiry is "yes", then a new screen of objects is to be added to the existing interface. Block 142 is executed next and the first new child within the new screen is identified by again using the Choose Menu. Then, a branch is made to connector H in FIG. 5G. If the result of the inquiry is "no", then screen modification for one of the existing screens displayed on the video display 14 is needed, and a branch to connector C in FIG. 5B is performed.

Figure 5B:
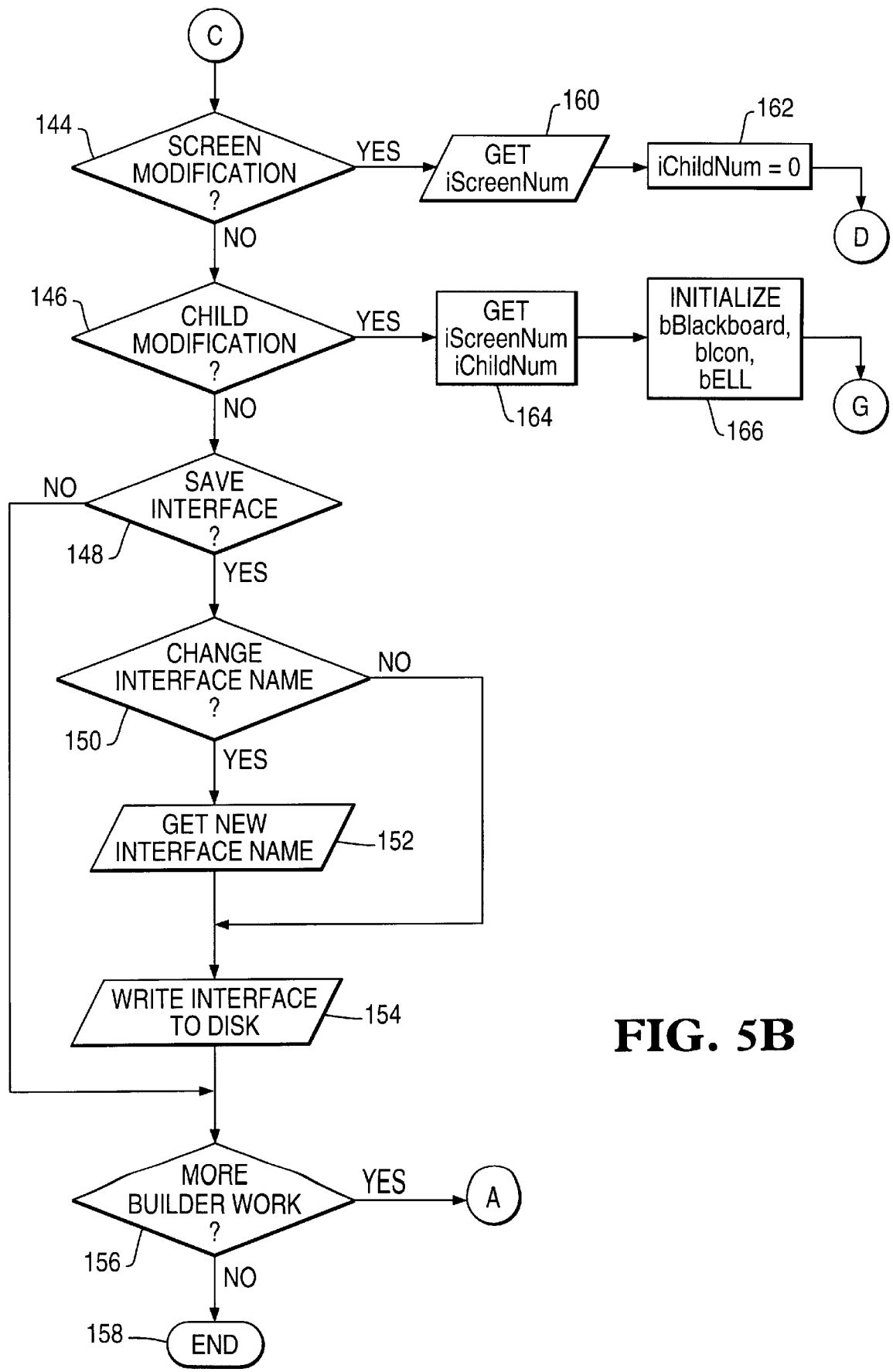
Figure 5C:
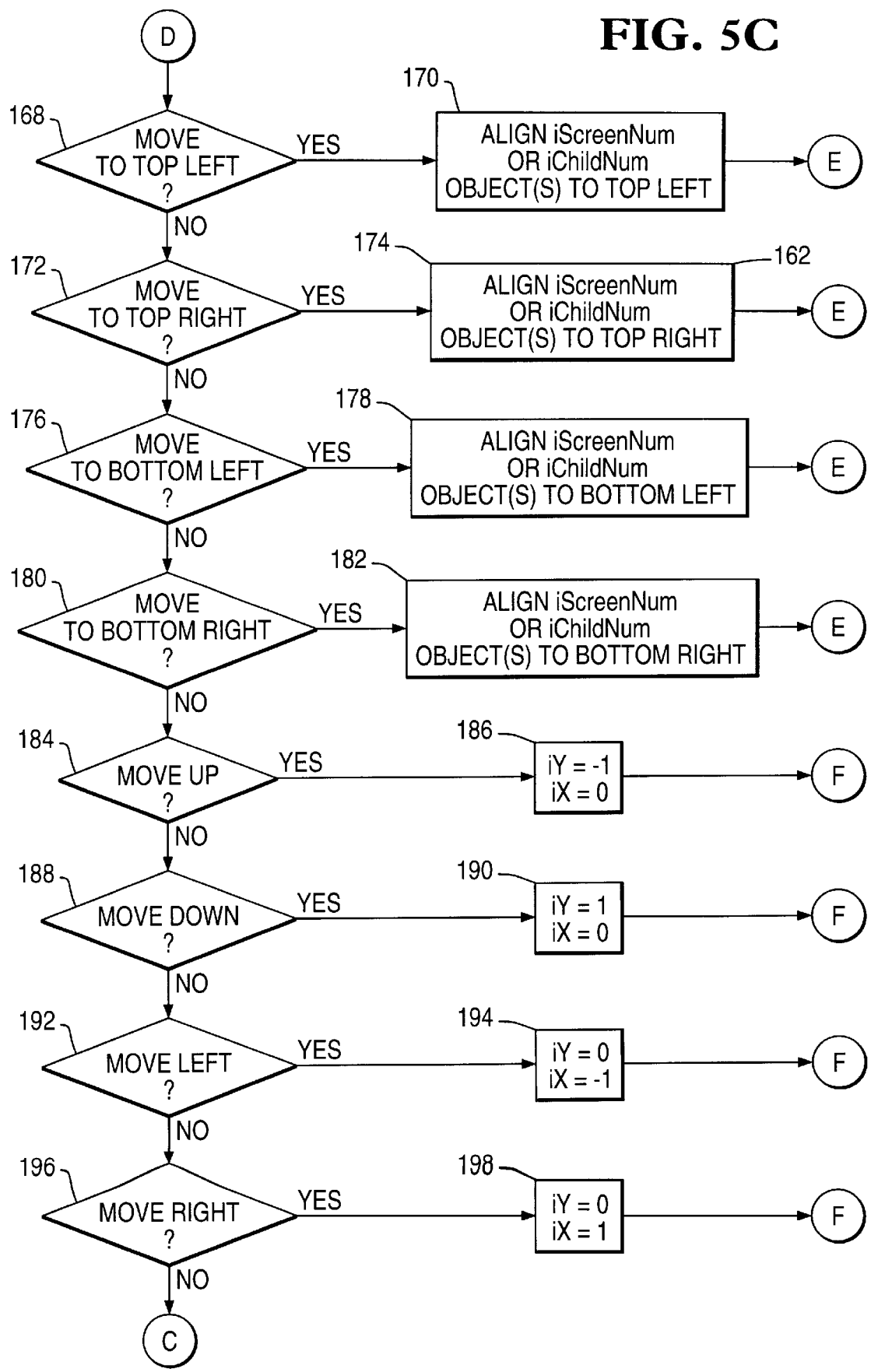
Figure 5D:
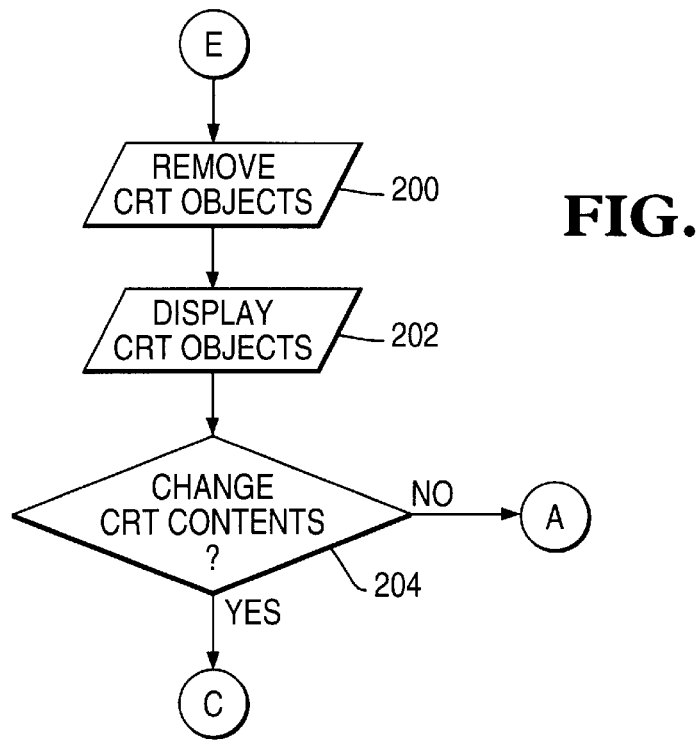
Figure 5E:
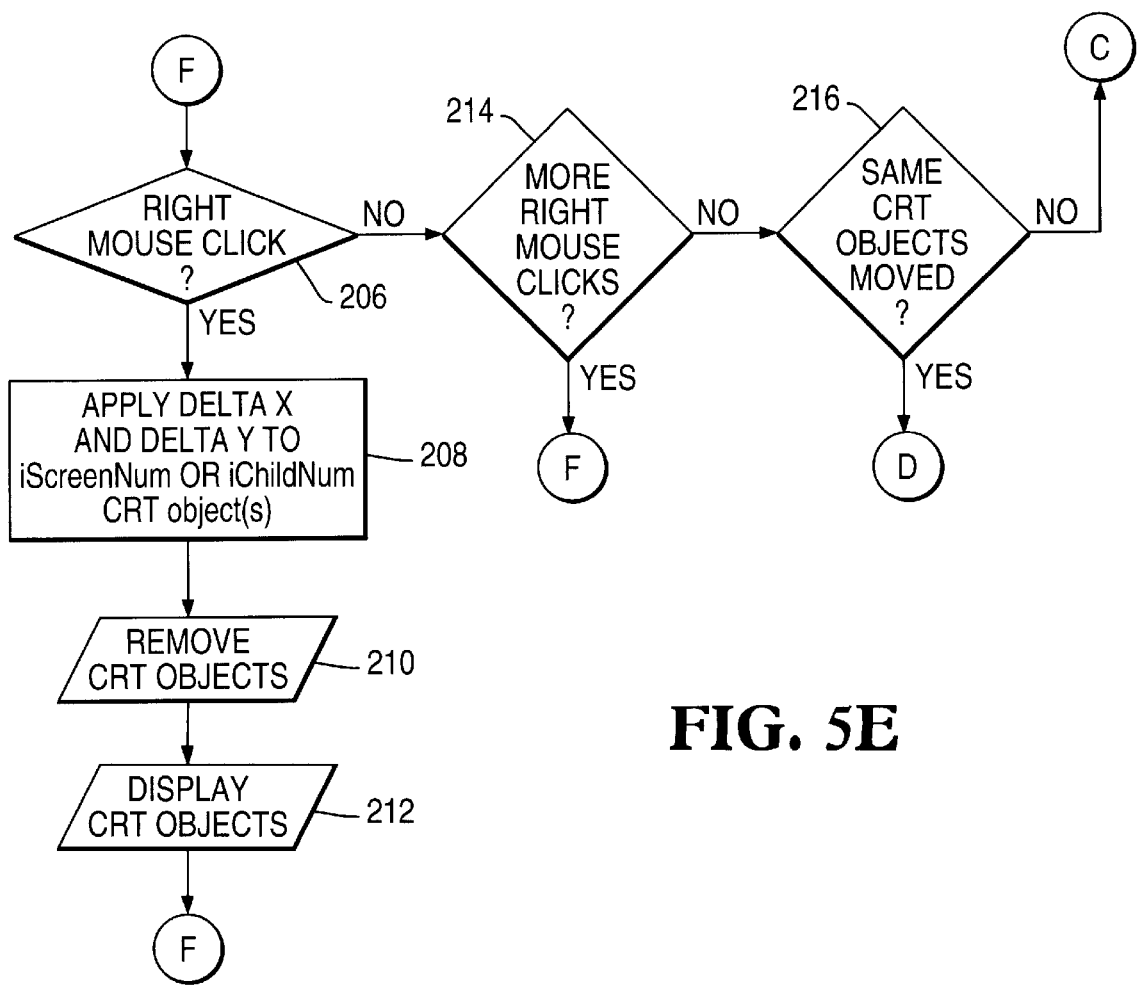
Figure 5F:
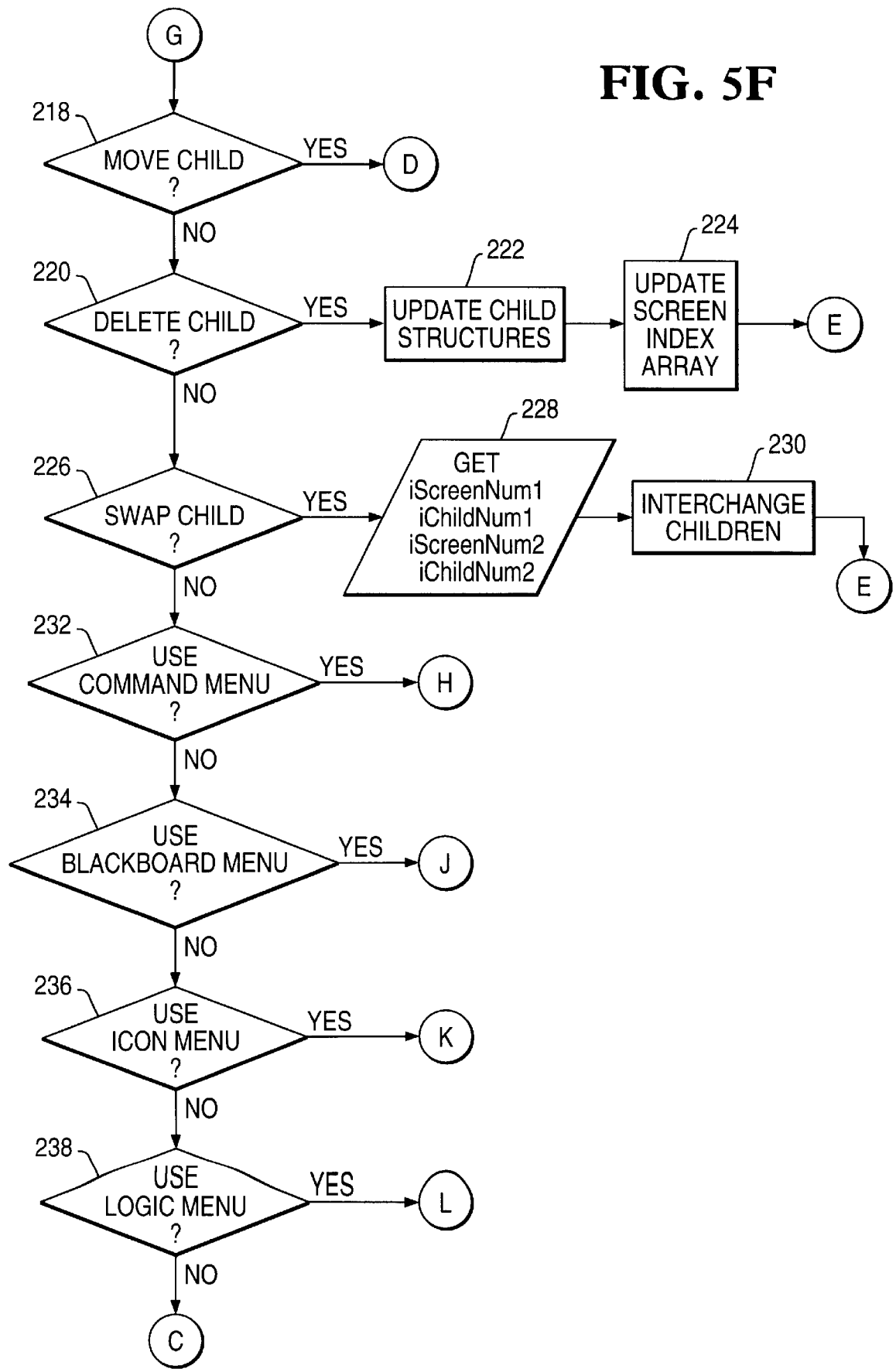
Figure 5G:
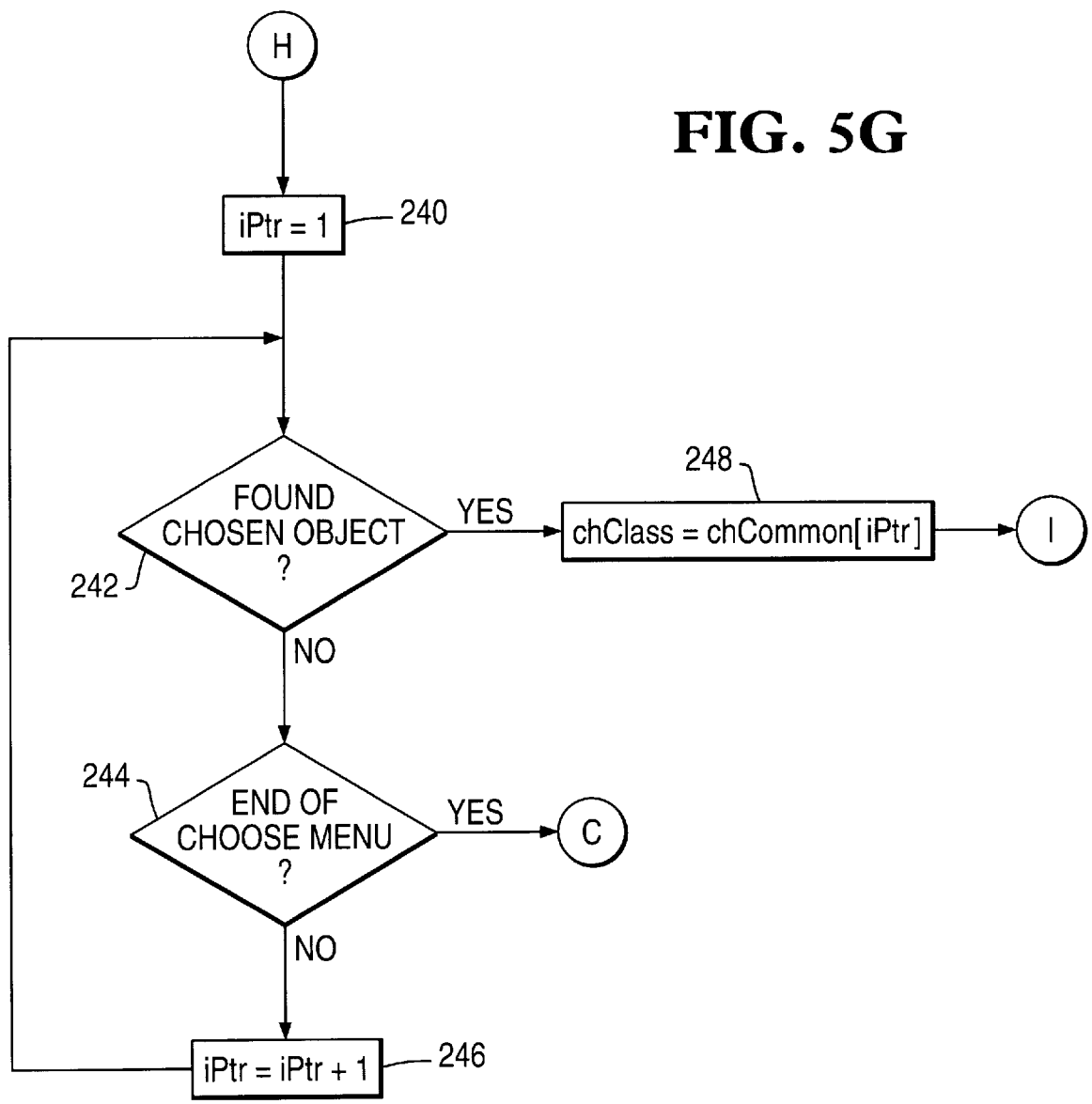

FIGS. 5B and 5G will now be explained. The first segment begins with FIG. 5B and is for the purpose of modifying a screen or a child. The second segment begins with FIG. 5G, where a new object type for a new screen is processed.

With reference to FIG. 5B, an inquiry is made at block 144 to see if any of the screens on the video display 14 need to be modified. This block may be implemented by selecting, for example, a "Screens" menu item from the Choose Menu if the answer is "yes". However, assuming the answer is "no", then block 146 is executed to see if any child is to be modified. Similarly, the implementation of this inquiry is to select the "Child" menu item from the Choose Menu if the answer is "yes".

Again assuming the answer is "no", then modifications for the current screen are not to be performed. This may seem contradictory since the builder tool <B> just prepared for video display 14 modification, but the inquiry simply shows the capability to not at this time have to make any modifications. In essence, one can change one's mind at any time and do something different. In FIG. 5B, connector C is where the program returns after certain kinds of modifications.

Continuing, block 148 is executed next and an inquiry is made to see if the interface is to be saved. The save can be performed by choosing either the "Save" or "SaveAs" menu items from the File Menu. If the result of the inquiry at block 148 is "no", then the save logic is bypassed and a branch is made to block 156. Block 156 is described in further detail below.

If the result of the inquiry at block 148 is yes, then block 150 is executed and the user decides whether or not to change the interface name. If the result of the inquiry is "yes", then block 152 is executed and a dialog is used to obtain the new interface prefix before block 154 is executed. If the result of the inquiry at block 150 is "no", then block 152 is skipped and a branch is made to block 154. The execution of block 154 causes the two interface files to be written to disk 18 using the existing or new interface prefix name.

Next, block 156 is executed and the inquiry is made whether or not to continue modifying the interface. If the result of the inquiry is "no", then block 158 is executed and execution of the builder tool <B> terminates. Again, block 156 is implemented by adding an "Exit" menu item to the File Menu. Continuing, if the result of the inquiry at block 156 is "yes", then a branch is made back to A in FIG. 5A-2 in case there are more interface modifications that need to be made.

Before finishing the FIG. 5B flowchart teaching, is may be noted that this flowchart can be executed after modifying the interface. Thus, the interface can be saved as often as needed, can be saved under different names, and, if desired, the program can be terminated without saving any of the current work done with the builder tool <B>.

Referring back to block 144 in FIG. 5B, if the result of the inquiry is "yes", then a screen and all of its associated objects are to be modified. Block 160 is executed next and a dialog is used to place the screen number in the variable "iScreenNum". Alternatively, the user may click, with the mouse's 24 right button, on a single object that is part of this screen, to effectively initialize the variable.

Next, block 162 is executed and the value in "iChildNum" is set to zero. This is performed because the same modification logic that applies to a screen can be applied to a child as well. Therefore, by giving the "iChildNum" variable an invalid value, the builder tool <B> can differentiate later between the two cases. Before looking at the flowchart steps in FIG. 5C that perform this kind of screen or child modification, FIG. 5B flowchart will be further explained.

Again, referring to the inquiry in block 146 in FIG. 5B, if the result of this inquiry is "yes", then a particular child on the video display 14 is to be modified Block. 164 is executed next and a dialog is used to place in "iScreenNum" and "iChildNum" the proper values. Alternatively, the user may click with the mouse's 24 right button on the object to initialize these values. Next block 166 is executed and the boolean variables "bBlackboard", "bIcon", and "bELL" are given their proper values based upon the type of NICE control. That is, if a child is to be modified, then only certain menu items from the Update Menu apply. These variables govern whether these menu items are made active or inactive. As the teaching of the present invention is described in further detail below, the purpose of the Update Menu will become apparent.

Next, the moving of screen and child objects will be discussed with reference to the FIG. 5C flowchart.

The flowchart in FIG. 5C provides the steps needed to a move a screen or a child on the video display 14 using several methods. The first block, block 168, is pointed to by the connector D, since there are several ways to reach this flowchart location. For example, we have already described that, in FIG. 5B, when a screen is to be modified, a branch will be made to D. Also, in FIG. 5B, when a child is to be modified a branch is not to D, but rather to connector G in FIG. 5F, whose flowchart will be discussed in further detail later. However, when the branch to G is made, one of the possible modification choices will result in a branch to D as well.

Referring back to the flowchart in FIG. 5C, a series of inquiries are first made to determine whether to move the screen or child to the top left of the video display, to the top right, to the bottom left, or to the bottom right. The inquiry blocks are 168, 172, 176, and 180, respectively. Assuming the result of all these inquiries are no, then a series of inquires are made in blocks 184, 188, 192, and 196, respectively, to see whether the movement is to be up, down, left, or right one pixel, based upon a 640×480 coordinate system in the preferred embodiment. Again, assuming the answer is "no" in each case, at this place in the flowchart a branch is made back to C in block 144, which has been previously explained. Again, the purpose of this branch is to illustrate that the Choose Menu selection is not binding with respect to a subsequent modification.

Returning back to the first block in FIG. 5C, if the result of the inquiry in block 168 is "yes", then the screen's objects or an individual object is to be moved to the upper left-hand corner. The implementation of block 168 involves choosing the "Top Left" menu item from the Position Menu. Then, the builder tool <B> knows that if the "iChildNum" value is 0, then it should align the screen. Otherwise, the builder tool <B> must align an individual child. The realignment process requires finding the delta x (horizontal) and delta y (vertical) values, and the pertinent interface slot values are altered by these amounts. For example, in FIG. 3A through FIG. 3C, notice each child has a "window" slot with four values. The first two numbers provide the location in (x,y) pixel format for the top left corner of the object. Therefore, it is straightforward to move a child to the upper left-hand corner, since delta x becomes −x and delta y becomes −y. But for moving a screen, the process is slightly more complicated because the critical children must be found, since their x and y values are used to determine the delta x and delta y for all the screen objects. The selection algorithm, however, is not too difficult to implement since the screen objects may be stored sequentially in an array of structure and the "window" slot information is stored in four fields within the structure. Recapping, when block 170 is executed, the designated screen object(s) coordinates are adjusted. A branch is then made to connector E in FIG. 5D.

The purpose of the flowchart in FIG. 5D is to perform the wrap-up work after a screen or object has been updated. When block 200 in FIG. 5D is executed, the CRT objects are all removed. Then, block 202 is executed and the CRT is updated reflecting the modifications. The inquiry in block 204 is executed next, and the purpose of this inquiry is to decide whether or not the CRT contents need to be further modified. If the result of the inquiry for block 204 is "yes", then a branch to C in FIG. 5B is made. If the result of the inquiry is "no", then a branch is made to A in FIG. 5A-2. In essence, the inquiry allows for more interface modifications to be performed, the file can be saved, the program can be terminated, or a combination of these tasks can be performed.

Referring again to FIG. 5C, the implementation of blocks 172, 176, 180, 184, 188, 192, and 196 are similar to block 168 where the Position Menu names are "Top Right", "Bottom Left", "Bottom Right", "Up", "Down", "Left", and "Right", respectively. Blocks 174, 178, and 182 are very similar to block 170 and it should be apparent how these are implemented. For blocks 186, 190, 194, and 198, one of the delta "iY" and "iX" variables is adjusted by 1 or −1 and the other is set to zero. This may seem counter-intuitive, but referring back to FIG. 2B, the box 272 that has the text "Payment:" and "$ 0.00" is actually the following two adjacent controls, each with no border: "Reply Box" and "Edit Box". Because these two boxes preferably need to appear to be seamless, it is advantageous to have a way to move, with precision, either of them after they are initially created. And so, the builder tool <B> may have a 1-pixel move function, which may move a box with granularity. Once blocks 186, 190, 194, or 198 are executed a branch is made to connector F in FIG. 5E.

The purpose of the FIG. 5E flowchart is to provide the steps needed for moving a screen or an individual object one pixel at a time by using the mouse 24, or equivalent pointing device. This is needed because it is common to have to move the object, say, a few pixels at a time and not just necessarily one. Therefore, the connector F in FIG. 5E is used to denote the start of a loop that allows for this functionality. The inquiry at block 206 is used to decide whether or not the right-mouse 24 button has been depressed. If the result of the inquiry is "yes", then block 208 is executed. This block causes the designated objects to have their upper-left corner coordinate values adjusted by the delta x and delta y values initialized in FIG. 5C. Next, block 210 is executed and the CRT objects are removed. Finally, the loop ends when block 212 is executed and the CRT is repainted to show the effect of the modification. A branch is then made back to F, which points to block 206. The effect of these steps is to allow right-mouse clicks to be made in rapid succession to effect fine-tuning of the location of a screen or individual object on the CRT 14.

Refer again back to block 206, suppose the result of the inquiry is "no", meaning no right-mouse 24 click has been detected yet. Then, block 214 is executed. If the result of the right mouse click inquiry of block 214 is "yes", then a branch is made back to F. If the result of the inquiry of block 214 is "no", then block 216 is executed. The purpose of the inquiry of block 216 is to determine whether more movements are needed or not for the specified objects. If the result of this inquiry is "no", then a branch is made back to C in FIG. 5B just as was done after the movements were to the top left, top right, bottom left, or bottom right. If the result of the inquiry at block 214 is "yes", then a branch is made to D in FIG. 5C to allow for more movements on the same designated CRT objects.

We now are left with presenting the modification steps performed by the builder tool <B> that follow after a "Child" menu item is selected from the Choose Menu and the child number is entered. Also, the steps for creating a new object must be given. To begin the teaching, reference is made again to FIG. 5B. In block 146, an inquiry is performed to determine if a CRT child needs to be modified. If the result of the inquiry is "yes", blocks 164 and 166 are executed, as previously discussed, before a branch is made to connector G in FIG. 5F.

Referring to the flowchart of FIG. 5F, when block 218 is executed, an inquiry is made to see if the specified CRT child is to be moved. If the result of the inquiry is "yes", then a branch is made to D in FIG. C. We have just finished with this flowchart, so nothing more needs to be said. If the result of the inquiry is "no", then block 220 is executed next Block 220 is implemented by having the user select a "Child" menu item from the Delete Menu. If the result of this inquiry is "yes", then the specified CRT child is to be deleted and block 222 is executed next. The result of the execution of block 222 is that the array of structure holding all the child objects is modified to reflect the removal. If the child is the only screen object, then the screen is removed also. Next, block 224 is executed and the screen index array is modified as needed. This array keeps the location in the array of structure of where the first child in each screen is located. Therefore, it is very easy to fetch the objects of a screen because the successive locations in the screen index array provide the necessary information.

After block 224 is executed, then a branch is made to E in FIG. 5D, where the wrap-up logic is depicted. This part of the flowchart of the builder tool <B> was explained earlier, but it is instructive to point out again that the purpose of FIG. 5D is to delete the CRT objects, repaint the CRT objects showing the changes in the CRT display 14, and then to determine where the builder tool <B> should continue.

Referring again back to block 220, if the result of the inquiry is "no", then block 226 is executed. Block 226 is implemented by having the user select a "Child" menu item from the Swap Menu. If the result of the inquiry at block 226 is "yes", then block 228 is executed. Here, a dialog is used to obtain the values in "iScreenNum1", "iChildNum1", "iScreenNum2", and "iChildNum2". Alternately, the right mouse 24 button may be clicked on the two objects to initialize these four variables. Then, in block 230 the two child objects are located in the array of structure and their contents are interchanged. Next, a branch is made to E in FIG. 5D for the purpose of modifying the CRT 14 contents and deciding what to do next.

In FIG. 5F, the final four inquiries allow an existing child to be modified using one or more of four menu items from the Update Menu. These menu items may be "Common", "blackboard", "Icon", and "Logic". These same menu items are also accessed when creating a new object. However, the difference in this case is that the "Common" item must be selected first, the displayed dialog must then be completed, and then the "OK" dialog button must be pressed before the object is actually created. Next, the relevant Update Menu items are activated and the other ones are left disabled.

Again referring to the inquiry at block 226, if the result of the inquiry at block 226 is "no", then block 232 is executed. If the result of this inquiry is "yes", then a branch is made to connector H in FIG. 5G, which is the same branch that is taken in FIGS. 5A-1 and 5A-2 after blocks 110 and 142 are executed and a new screen of objects is to be created. Therefore, the FIG. 5G discussion will be described in further detail later, after the rest of FIG. 5F is explained.

Continuing, if the result of the inquiry at block 232 is "no", then the "Common" modification work is not needed and block 234 is executed. If the result of block 234's inquiry is "yes", then a branch is made to J in FIG. 5I. This flowchart is also explained later. If the result of the inquiry at block 234 is "no", then block 236 is executed. If the result of the inquiry of block 236 is "yes", then a branch is made to K in FIG. 5J. Once again, this flowchart is explained later.

If the result of the inquiry at block 236 is "no", then block 238 is executed next. If the result of the inquiry is "yes", then a branch is made to L in FIG. 5K. Again, this flowchart is discussed later. Finally, if the result of the inquiry of block 238 is "no", then a branch is made back to C in FIG. 5B. The reasoning behind this final branch is that if a child has been selected for some kind of modification, then an escape path is needed should the user decide not to do the intended modification. Hence, a return to C is permitted if the specified child is not modified at this particular time.

The remainder of the flowcharts for the builder tool <B> pertain to the use of Update Menu items that are used to create a new NICE object or to modify an existing NICE object in ways other than those that have been discussed so far. In review, therefore, the four Update Menu items are "Common", "Blackboard", "Icon", and "Logic".

Consider now the connector H in FIG. 5G. Recall that there are two ways of getting to H. First, suppose a new object is to be created and one of the last Choose Menu items is selected as is done in blocks 110 and 142 in FIGS. 5A-1 and 5A-2. Then, initial control information is stored in a temporary structure with the pertinent NICE control slots given default information before the branch is made. Second, suppose the "Child" menu item is selected from the Choose Menu. Then, the child's array of structure information is also placed into the temporary structure before the branch to H is made in FIG. 5G. Therefore, the creation and modification tasks can be combined into one which simplifies the logic of the builder tool <B>. As a result, the four Update Menu items are used to modify the temporary structure. Then, if desired, this structure is used to update the array of structure to reflect the actual interface. The first step in this process is to determine the class of the new object selected. This is needed to determine later what dialog should be displayed when the "Common" menu item is chosen.

Refer now to FIG. 5G, beginning with connector H. When block 240 is executed, then the "iPtr" variable is initialized to 1. Next, the loop implemented in blocks 242 through 246 is executed until the object name chosen earlier matches one from a list of new objects, or no match is found. Continuing, after block 240 is executed, block 242 is executed next. If the result of the inquiry of block 242 is "no", then block 244 is executed. If the result of this inquiry is "yes", then a branch is made to connector C in FIG. 5B. This again provides an escape path if the user decides not to go forward with the interface update but instead decides to either do a different modification, save the program, or terminate the program.

Continuing, if the result of the inquiry at block 244 is "no", then the "iPtr" variable is incremented by 1. Next, block 242 at the start of the loop is executed again. The loop continues until the result of the inquiry at block 242 is "yes", meaning the control class is known. Then, block 248 is executed. Here, the "chClass" variable is given the "chCommon [i]" variable string value corresponding to the menu selection made from the Choose Menu. Then, a branch is made to connector I in FIG. 5H where the value in "chClass" is needed.

Figure 5H:
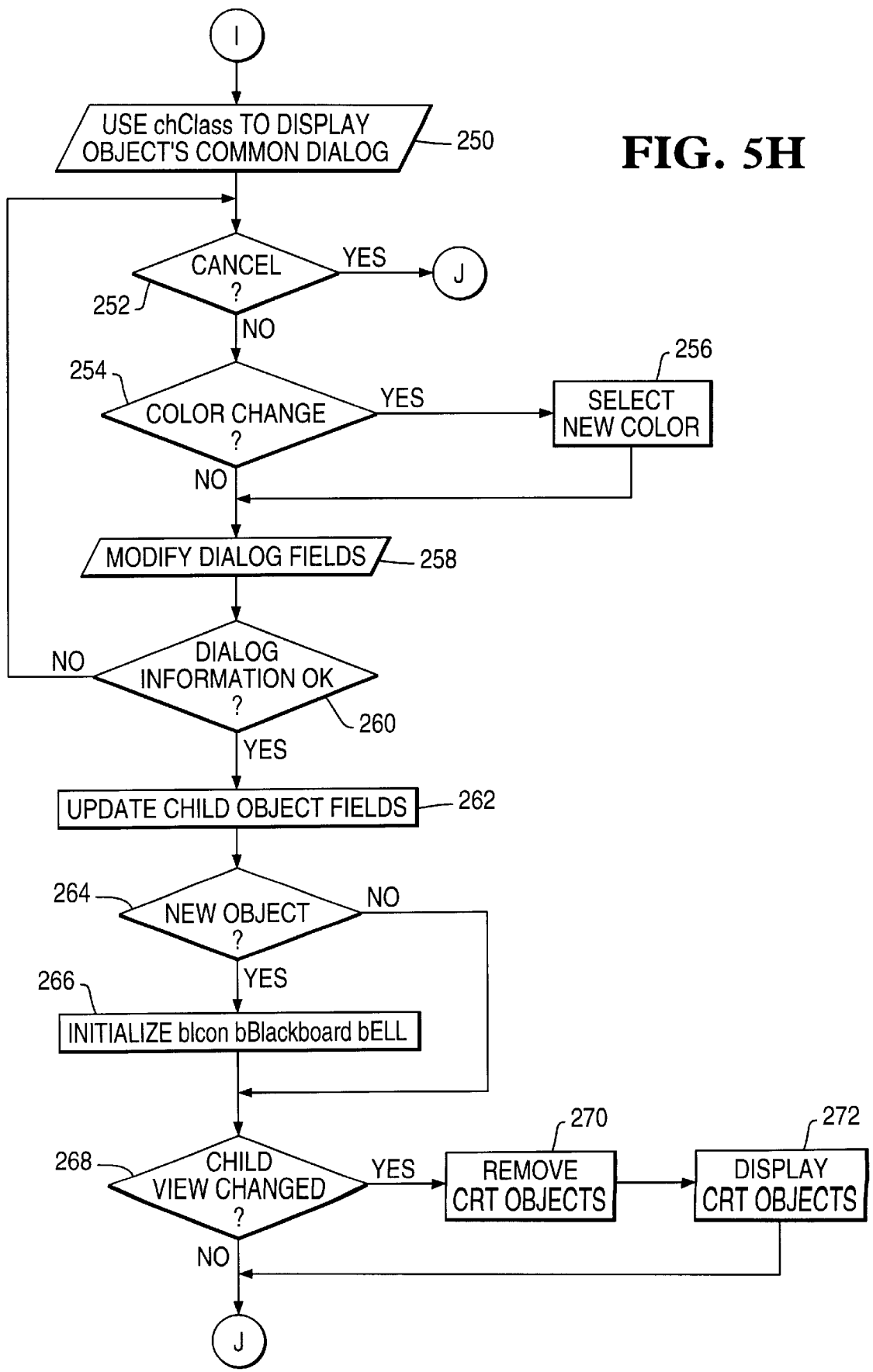

With respect to FIG. 5H, when the "Common" menu item is selected from the Update Menu, then block 250 is executed. The dialog that is displayed is dependent on the value in the variable "chClass" and is directly related to the type of NICE control. This will be described in further detail later. Next, an inquiry is made at block 252. If the result of the inquiry is "yes", then the "Common" dialog is exited, and a branch is made to connector J in FIG. 5I to see if any "blackboard" work is to be done, discussed further later. If the result of the inquiry is "no", then block 254 is executed. If the result of the inquiry of block 254 is "yes", then block 256 is used to obtain the new color. The first step in this process is to use a Windows dialog to click on a pre-defined color shown within a rectangle. Equivalently, the user can click with the mouse 24 on a ban of colors to obtain a column color for which further clicks within the column enable the color to be fine-tuned. Or a user can enter in the 3-digit values for the Red, Blue, and Green components of the color. Then, once the Windows color dialog "OK" button is clicked, a return is made to a dialog of the builder tool <B>, where the object's numeric color values are modified. If the "Cancel" button is clicked within the Windows color dialog, then the dialog color values remain the same. For new objects, the three values on its dialog are −1 indicating no color. Not all of the ten NICE controls may allow for color, so blocks 254 and 256 may not actually be executed in all cases.

Block 258 is executed next. Here the user fills in or modifies the "Common" dialog information. Of course, error checking may also be performed. Next, block 260 is executed. If the result of the inquiry of block 260 is "no", then a branch is made again to block 252 where the user can cancel or modify the current dialog contents. If the result of the inquiry at block 260 is "yes", then block 262 is executed and the temporary structure is updated. Then, this information is merged with the array of structure information that holds the actual interface data.

Next, block 264 is executed. If the result of the inquiry of block 264 is "yes", meaning the object is a new object, then block 266 is executed next. This block initializes the "bIcon", "bBlackboard", and "bELL" boolean variables so that the last three Update Menu items are enabled when their respective boolean value is TRUE and disabled when their boolean variable value is FALSE. The settings relate to the type of control. For example, a "Reply Box" control is not associated with any logic, so the "bELL" value is FALSE.

If the result of the inquiry at block 264 is "no", then block 266 is skipped because the three boolean variables already have their proper values. Continuing, block 268 is executed next. If the result of the inquiry of block 268 is "yes", then the "Common" dialog has changed the child with respect to how it is viewed on the CRT 14. That is, either the child is a new child or an existing child is changed with respect to its color, size, or location. Therefore, blocks 270 and 272 are executed to reflect the change on the CRT 14. Also, the rectangular frame of the object is given focus with the Windows resizing handles, so the object can be moved or resized. The resizing handles may be removed by clicking the right mouse 24 button or choosing another menu item. Continuing, if the result of the inquiry of block 268 is "no", then blocks 270 and 272 are bypassed. Finally in FIG. 5H, as was done in block 252, a branch is made directly to J.

Figure 5I:
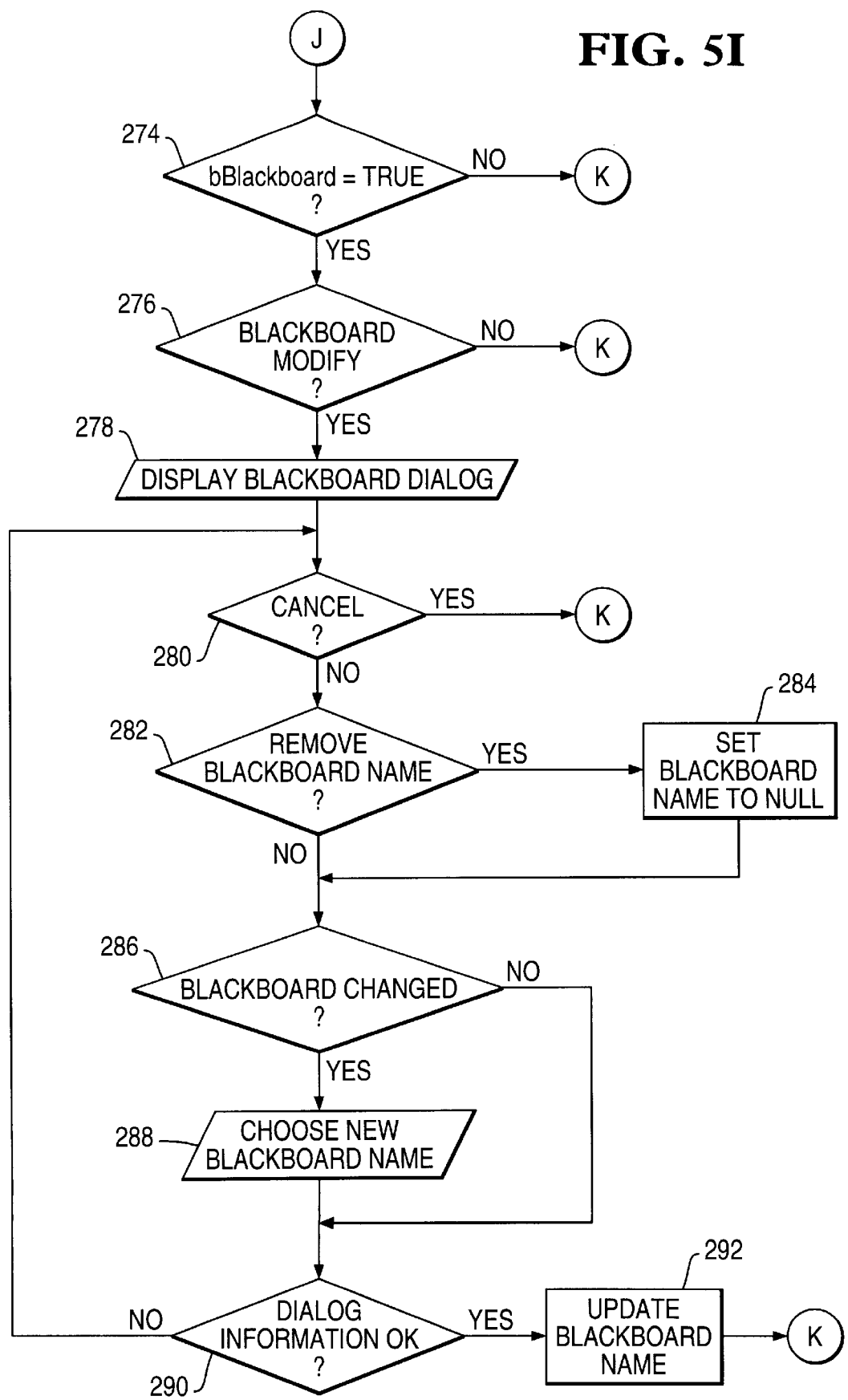

Connector J in FIG. 5I is branched to after the "Common" work is finished or if no "Common" work is to be performed and the child can be modified in some other way. Continuing, when connector J is reached, then block 274 is executed. If the result of the inquiry of block 274 is "no", meaning that the "Blackboard" menu item is inactive, then a branch is made to connector K in FIG. 5J. This flowchart is discussed after the present one. If the result of the inquiry at block 274 is "no", then block 276 is executed. If the result of the inquiry of block 276 is "no", then no "blackboard" modification work is to be performed, even though the menu item is enabled. Then, a branch is made to K. If the result of the inquiry at block 276 is "yes", then the "Blackboard" dialog is displayed. This dialog is common for all of the NICE controls.

To understand more fully the use of this dialog, refer again to the Touch Screen display in FIG. 2B. Notice what appears to be six horizontal buttons (261 through 268) giving the tendering choices. Actually, these buttons are a part of a single Flex Bar object. This object needs a symbolic tag because when other buttons, such as the "Discount" button, are pressed, new information is entered which changes the purchase amount. This means the text on the face of the Flex Bar must then be modified. However, the ELL function associated with the "Discount" button does not know the screen or child number associated with the Flex Bar at compile time. This problem is solved by assigning a symbolic "Blackboard" name to the Flex Bar object. This is discussed in further detail later.

The interface language for this 6-button Flex Bar 1311 is given in FIG. 3B. Notice, that the "blackboard" slot value has a number 4 along with the name "CASH_FLEX_BAR". This means the fourth entry in the "blackboard.dat" supporting file is the one with the name "CASH_FLEX_BAR". In short, the purpose of the FIG. 5I flowchart is to incorporate a "blackboard" slot with the object or to take away an existing slot.

After block 278 in FIG. 5I is executed, and the "blackboard" dialog is displayed, then block 280 is executed next. If the result of the inquiry of block 280 is "yes", then the dialog is exited, the current "blackboard" status is unchanged, and a branch is made to K in FIG. 5J. If the result of the inquiry at block 280 is "no", then block 282 is executed. If the result of the inquiry of block 282 is "yes", then the "blackboard" name is set to NULL. Block 284 is implemented by placing a Windows button, which can be depressed at any time, on the dialog screen. If the result of the inquiry at block 282 is "no", the "blackboard" status is unchanged and block 286 is executed immediately. On the other hand, if the result of the inquiry of block 282 is "yes", then block 288 is executed.

The implementation of this block is performed as follows: First, a list box is populated with the "blackboard.dat" names and they appear in alphabetical order. Second, another box is used in conjunction with the list box to choose the desired "blackboard" name. In this box, as one yes the choice, the corresponding list box entry is highlighted.

Continuing, if the result of the inquiry at block 286 is "no", then no new "blackboard" name is selected. Next, block 290 is executed, both for the case when a new "blackboard" name is entered and when the "blackboard" status is unchanged. If the result of this inquiry is "no", then the dialog screen contents are left unchanged. Then, a branch is made back to block 280, where either the dialog information can be modified or the dialog can be canceled. If the result of inquiry at block 290 is "yes", then the temporary structure is updated and merged with the array of structure information in block 292 and a branch is made to K in FIG. 5J.

Figure 5J:
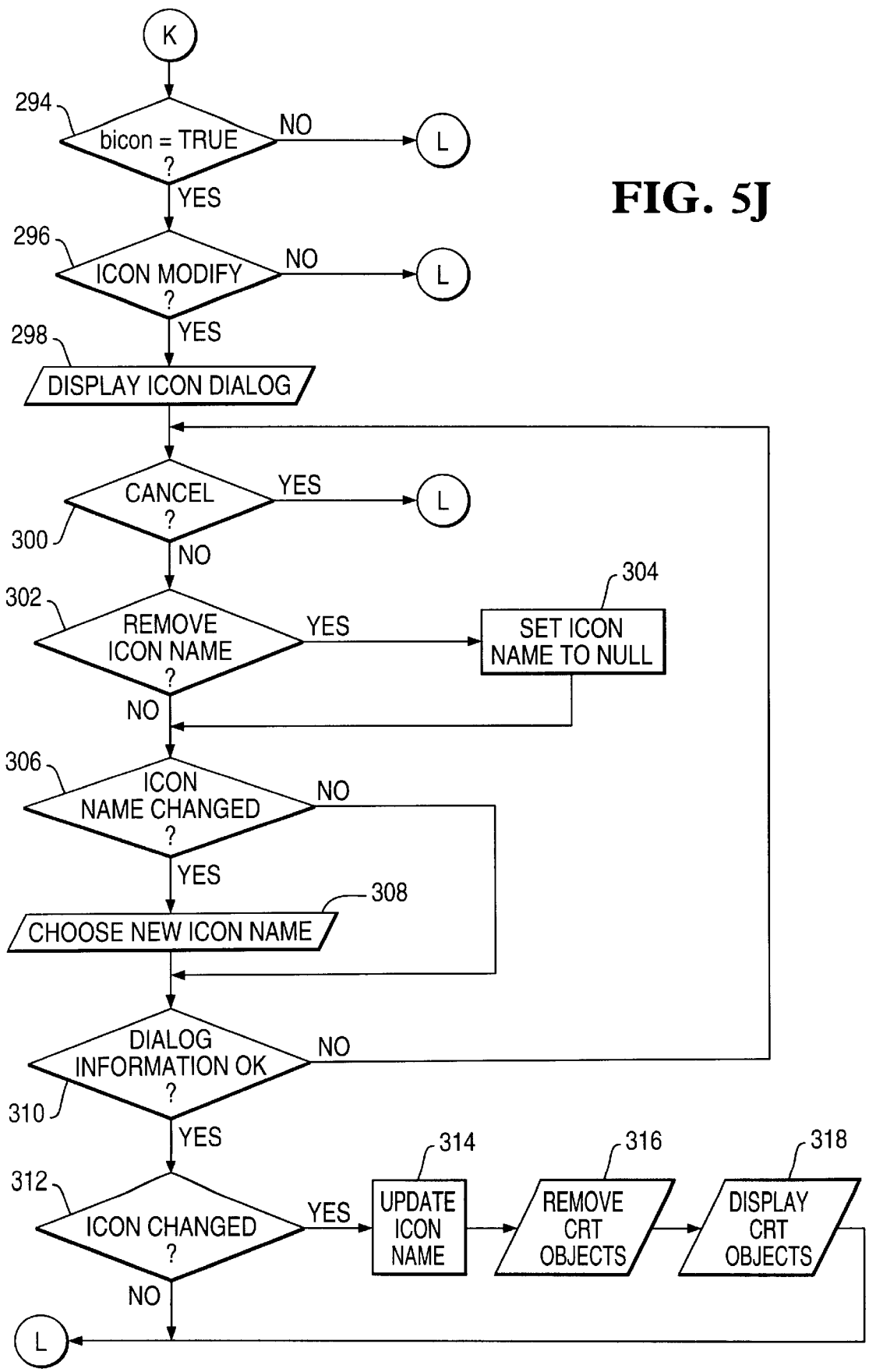

Connector K in FIG. 5J is very similar to connector J in FIG. 5I except this connector is related to a NICE Icon modification rather than a "blackboard" modification. To visualize the icon concept, refer again to the "As a Meal" control 213-1 in the Touch Screen display 213 in FIG. 2A. Notice the picture 213-1P that looks like a bowl of salad. The NICE system provides many such icons that are useful in retail and other domains. In FIG. 3A, the "As a Meal" interface representation 1304 has a slot 1304-3 entitled "icon". In this case, the value is "SALAD_C". The program resolves this name association through the builder tool 's <B> ".rc" file. The mapping is done with the actual name and path within the NICE directories.

In FIG. 5J, for blocks 294, 296, 298, 300, 302, 304, 306, and 308, the "bIcon" variable is used instead of "bBlackboard" and the list box is populated from the NICE icon directory instead of the "blackboard.dat" file. Therefore, the commentary for these boxes is not repeated. Continuing, after block 308 is executed, then block 310 is executed. If the result of the inquiry of box 310 is "no", then a branch is made to block 300 where further dialog changes can be made or the dialog can be canceled. If the result of the inquiry of box 310 is "yes", then block 312 is executed. If the result of the inquiry of box 312 is "yes", then blocks 314 through 318 are executed before a branch is made to connector L in FIG. 5K. These three blocks modify the temporary structure and merge it with the array of structure holding the child information, remove the CRT objects, and redisplay immediately the CRT objects incorporating the icon change. This facilities checking if the correct icon assignment is made. Continuing, if the result of the inquiry at block 312 is "no", then the three blocks are bypassed and a branch is made to L directly.

Figure 5K:
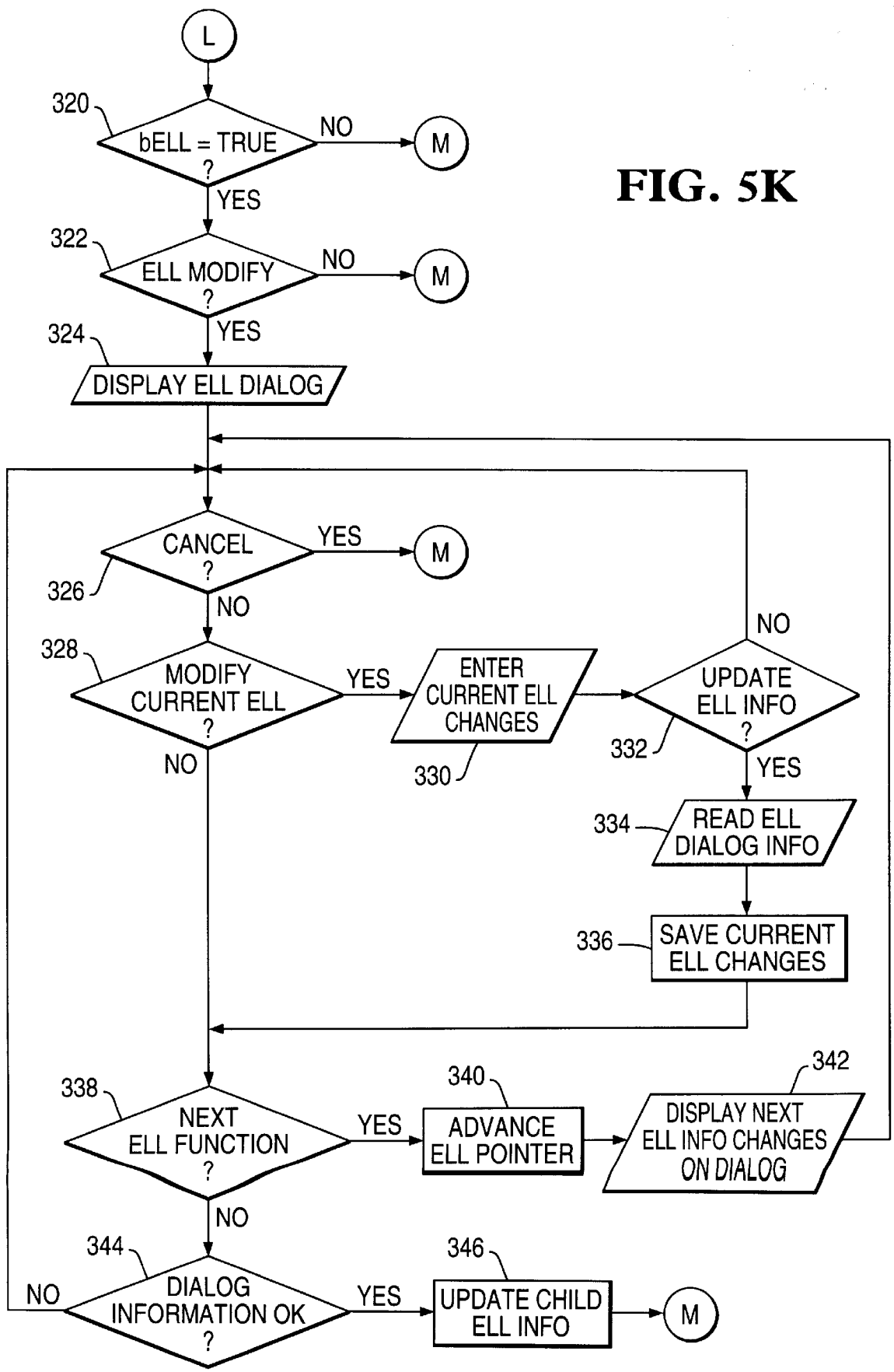

The final building tool <B> flowchart associated with the Update Menu is shown in FIG. 5K. Here, the ELL information can be modified or it can just be viewed. To illustrate, consider the first NICE control 1311 with its slots in FIG. 3B. Recall, that this control 1311 is a Flex Bar object and, in general, this object can have from 2 to 8 buttons. In this case there are 6 buttons. The 6th slot 1311-6 for this object has the name "entry" and its associated data is the text "y". This means that the control is associated with runtime system <R>. Notice that following the "entry" slot, the next three slot names 1311-7, 8 and 9 are: "function1", "destroy1", and "create1". When the "Cash" button in the Touch Screen display in FIG. 2B is pressed, then the function that is accessed is named "Flex_Cash_Special1". This happens to be the 39th function in one of the supporting files named "keylogic.dat". The next slot "destroy1" gives a list of screens to be destroyed when this ELL function finishes executing. The screen number list is terminated with a −1 value. Next, the "create1" slot gives a list of screens to be created once the previous screens are removed from the CRT. Likewise, there are similar slots for each of the remaining five buttons that are a part of this Flex Bar.

Referring now to FIG. 5K, where the steps for entering ELL information are given, first, block 320 is executed. If the result of the inquiry of block 320 is "no", meaning the "Logic" menu item is inactive, then a branch is made to connector M in FIG. 5L. This flowchart is described further later. If the result of the inquiry of blcok 320 is "yes", then block 322 is executed to see whether or not any of the ELL information needs to be modified. If the result of the inquiry of block 322 is "no", then a branch is made to M as before and no ELL modifications are made, even though they are permitted. If the result of the inquiry of block 322 is "yes", then block 324 is executed. Here, the initial ELL dialog information is displayed with a "→" pointer to the left of the "Function 1" text. This is performed because the same dialog is used for specifying information for all of a button's functions. Also, a list box is displayed with all the ELL function names appearing in alphabetical order. Above the list box is a ELL selection box that shows the default or current ELL function name that is associated with the first function.

Next, the destroy and create screen information is given for the normal branching and the auxiliary branching. This information is simply a list of screens for each of the four categories. The slot names associated with the normal branching are "destroyi" and "createi" and the slot names for the auxiliary branching are "destroy_auxi" and "create_auxi" respectively. The final "i" in the slot names just given denotes a number from 1 to 8. For each of these branching classifications, a maximum number of screens is allowed. When the branching information is incorporated into the interface slot language, each list of screens is terminated with a −1, as already mentioned.

Continuing, after block 324 is executed, block 326 is executed. If the result of the inquiry of block 326 is "yes", meaning cancel the current dialog, then the ELL information is unchanged and a branch is made to M in FIG. 5L. Again, this flowchart will be described further later. If the result of the inquiry of block 326 is "no", then block 328 is executed. If the result of the inquiry of block 328 is "yes", then block 330 is executed. The input work at block 330 is performed by using the dialog editor to override, as needed, the branching information and the ELL function name for the first function. Next, block 332 is executed. If the result of the inquiry of block 332 is "no", then the current function modification work is aborted and a branch in made to block 326 where the ELL function work can be continued as needed. If the result of the inquiry of block 332 is "yes", then the "Select" button on the dialog is pressed, and the dialog information is read as shown in block 334.

Next, block 336 is executed and the new dialog information is retained in memory and a branch is then made to block 338. Block 338 is also executed when the result of the inquiry at block 328 is "no". If the result of the inquiry at block 338 is "yes", then the control's next ELL information is to be accessed and displayed on the dialog screen and the "→" pointer is advanced to the next "Function i" text, where "i" is from 1 to 8. If the button has only one function, then the pointer and dialog information remain unchanged. Recapping, when block 340 is executed the pointer is advanced. Then, block 342 is executed and the dialog contents reflect the advancement. Continuing, a branch is then made to block 326 where more ELL changes can be made or the dialog can be canceled. If it is canceled, then all the current changes are discarded.

Referring again to block 338, if the result of this inquiry is "no", then block 344 is executed. If the result of the inquiry of block 344 is "no", then a branch is made back to block 326 where more ELL updates can be made or the dialog can be canceled. If the result of the inquiry is "yes", then block 346 is executed. Here, the array of structure for the child is updated to reflect the dialog changes. Next, a branch is made to M in FIG. 5L.

Figure 5L:
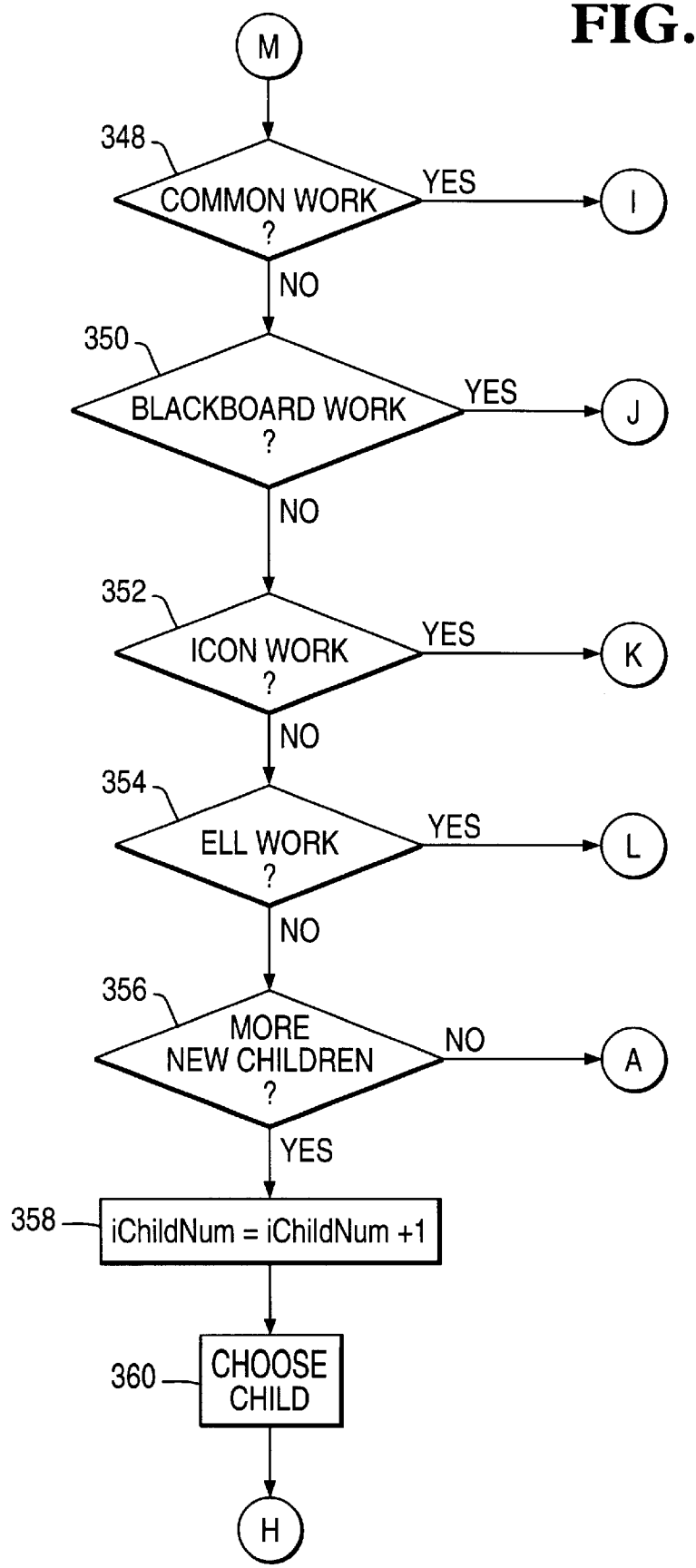

The final flowchart of builder tool <B> appears in FIG. 5L. The purpose of this flowchart is to decide what to do after the four Update Menu items have been used. For completeness, the four inquiries allow for the four Update Menu items to be accessed again as needed. Therefore, if any of the inquiries in blocks 348, 350, 352, and 354 are "yes", then branches are made to I, J, K, and L respectively. If the result of these inquiries are all "no", then block 356 is executed. If the result of this inquiry is "no", then a branch is made back to A in FIG. 5A-2. In essence, the branch is taken after the new screen is fully constructed. If the result of the inquiry is "yes", then block 358 is executed and the variable "iChildNum" is incremented by 1. Next, block 360 is executed and the next Choose Menu selection is made to identify the next new object to be added to the new screen. Next, a branch is made to H in FIG. 5G to repeat the process of using the four Update Menus to build the next NICE object.

Some final remarks about the "Common" dialogs used in the builder tool <B>. These dialogs are the cornerstone for the present invention because the dialog fields allow for easily populating the slots shown in FIG. 3A through 3C. Later the interface language can be parsed and incorporated as arguments into the appropriate Windows commands to cause a Touch Screen display 32 to be painted and managed.

The 1994 publication entitled NICE® Client, Programming Information for C, Release 1.2 (available from NCR Corporation) explains every NICE control and their capability. Therefore, the common dialogs used in the builder tool <B> capture this information using a variety of dialog techniques such as text, radio buttons, and other kinds of fields. The intricacies of constructing Windows menus, menu items, and dialogs may be found by reading the 1992 book Programming Windows™ 3.1 by Charles Petzold, or a similar readily available reference for other operating systems and/or operating environments.

Finally, the "Common" dialogs include several generic pieces of information. First, the respective screen and child number always appear and these can be modified. For example, if a new "Reply Box" is to be added to an existing screen, then when this choice is made from the Choose Menu, the builder tool <B> assumes a new screen as already mentioned. But if the new object is to be added to an existing screen, then the dialog screen number can be modified and a "before" or "after" radio button can be used to place the new object in the proper place in the existing screen. Second, the four coordinates associated with the "window" slot can be given with respect to a 640×480 pixel representation or with respect to inches by using a radio button to denote the desired state. If inches are specified, then the four values are not entered as decimal numbers, but as 3-digit values. For example, 2.5 inches would be entered as 250. This is very handy when using the builder tool <B> to leverage off an existing NICE Touch Screen interface. Once the "OK" button is pressed, then these coordinates are converted to pixel format.

Another handy feature of the builder tool <B> of the present invention may be that if similar new buttons are being constructed, then the "Common" dialog will assume the same sized control and will use previous spacing between the objects. For example, referring back to FIG. 2D, notice the Touch Screen display 232. There are ten pizza toppings to construct and it is useful only to have to enter the size once. From then on, the "Common" dialog will "know" the size. Of course it can be changed, but usually it can be left as is.

2. The Tester Tool

Figure 4:
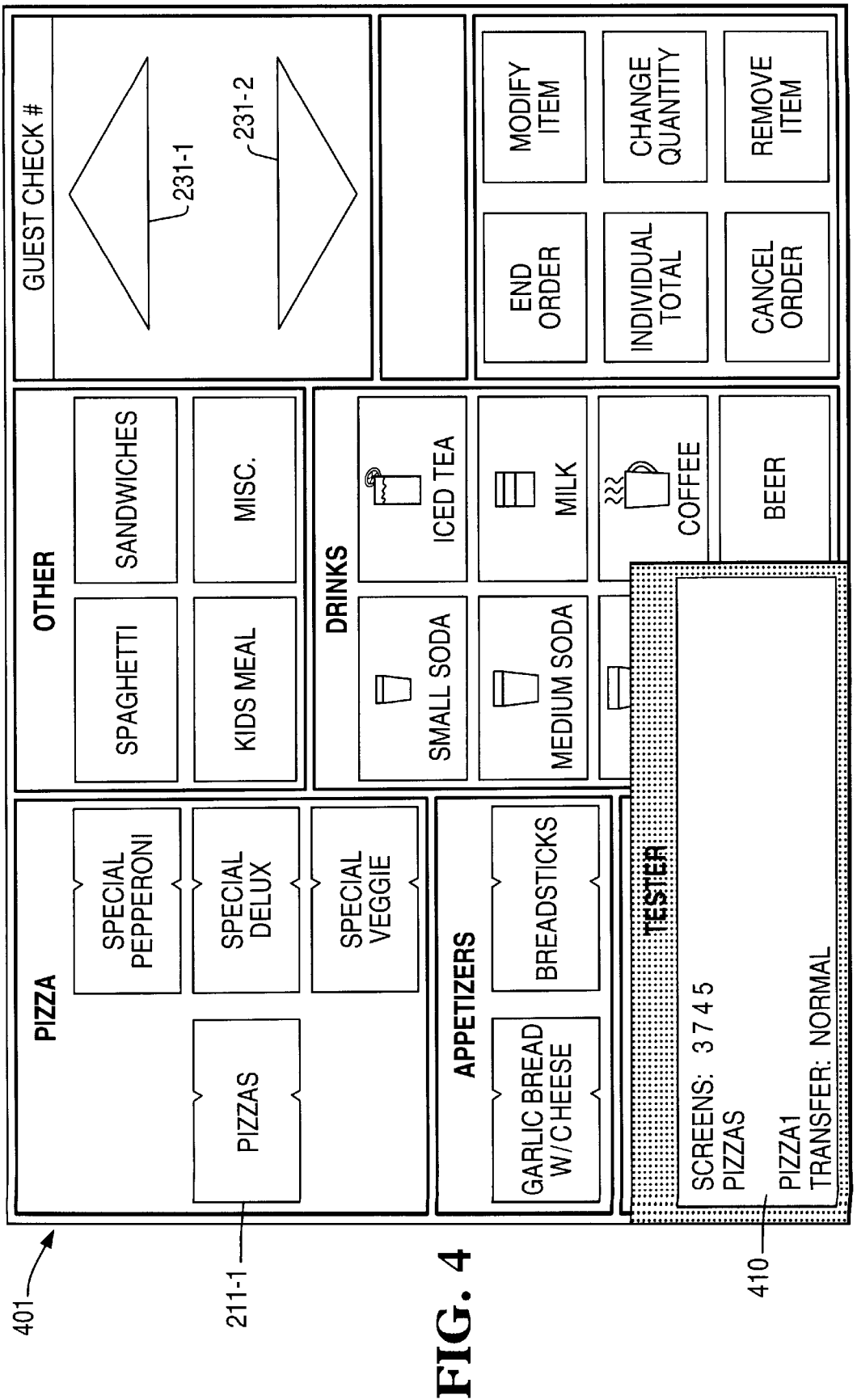
FIG. 4 is a visual depiction of a tester in accordance with the teachings of the present invention.

The teaching of the tester tool (hereinafter also referred to as <T>) is now provided. With reference to FIG. 4, notice the tester window 410 superimposed over the Touch Screen display 401. The first line of text in the tester window 410 is a list of screen numbers that define the current Touch Screen display 401. The next two lines in the tester window 410 show the text that is the button face text of the logical object being analyzed. In this case, the button has one line of text and it is "Pizzas". Immediately following this line is a blank line. Next, the ELL function name is given. In FIG. 4, the name is "Pizza1" and this name is in the "keylogic.dat" file, and also the name corresponds to a function defined in the run-time system <R>, which will be described later. The last line of the tester window 410 gives the type of branching, either normal or auxiliary.

In summary, when a Touch Screen display is first displayed on the CRT 14 by the tester tool <T> component of the present invention, then all of its logical buttons are tested, one at a time, as if they are touched by the user. The tester window 410 either appears as it does in FIG. 4 or it may be moved to the upper left-hand corner (or any other area of window 401) if the window 410 will cover the object being tested. In short, the tester tool <T> of the present invention visually carries out the traversing of the paths in the external interface.

Figure 6A:
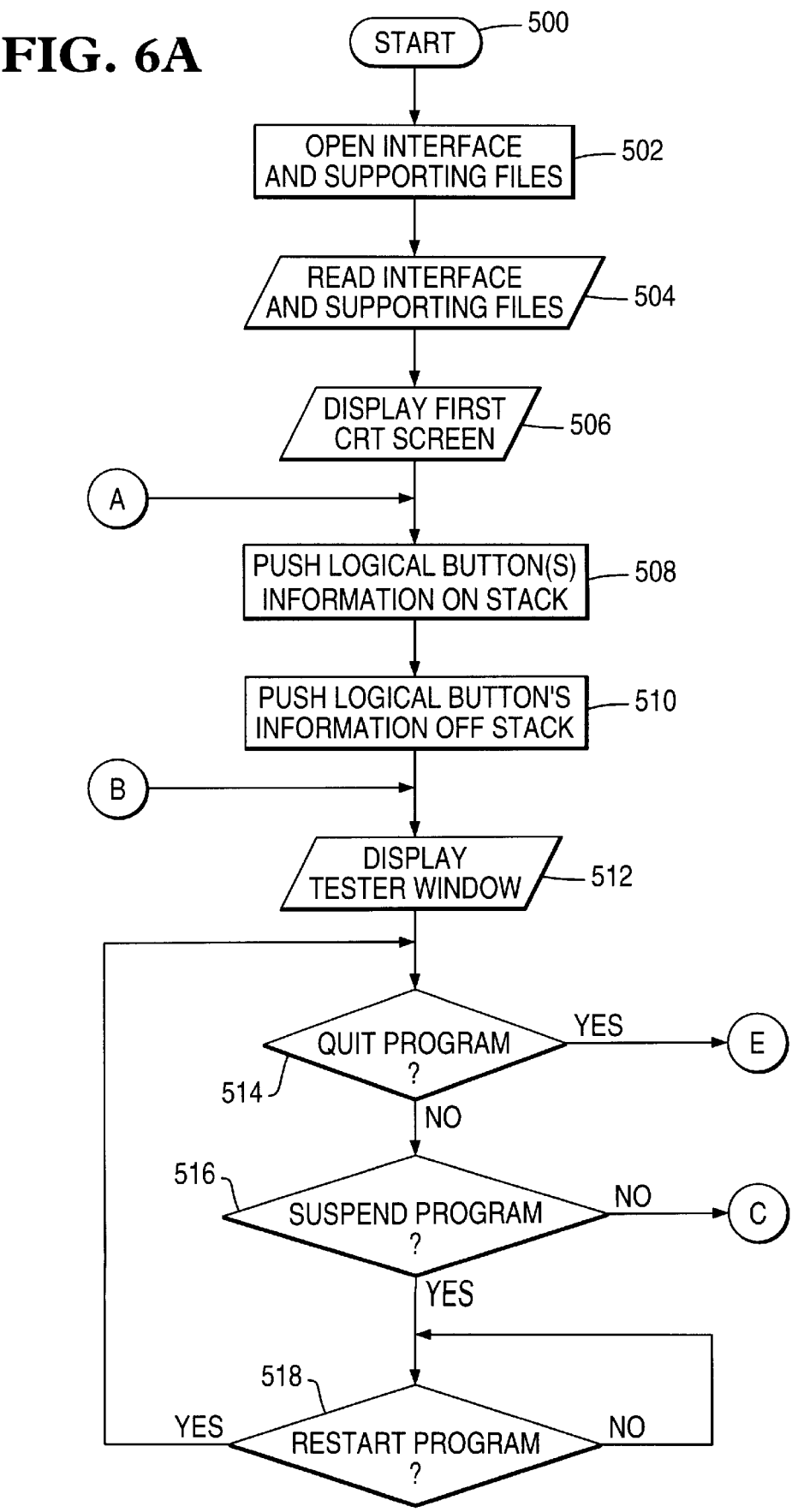
FIGS. 6A and 6B are flowcharts depicting the steps that may be performed when testing a touch screen interface.
Figure 6B:
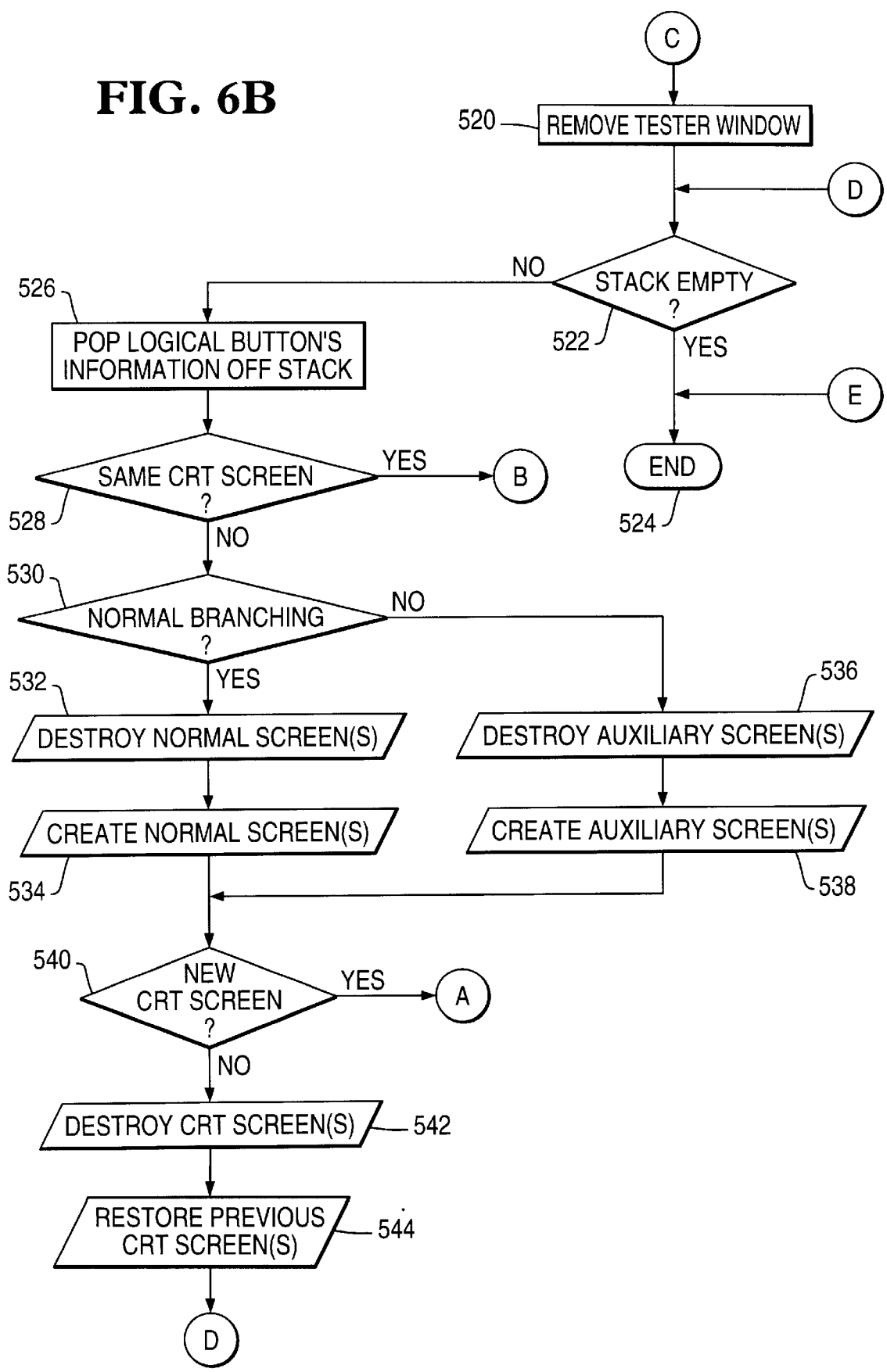

Referring to the flowchart of FIG. 6A through FIG. 6B, the tester tool's <T's> execution starts at block 500 and continues to block 502. When block 502 is executed, the two interface files and the two supporting files are opened, similar to the performance of the builder tool <B>. This time, however, the interface prefix is not chosen but is assumed instead to be "autopos". The reason for this is that this interface will be the one used by the run-time system <R> (described later). Next, blocks 504 through 506 are executed sequentially and they are identical to blocks 114 through 116 in FIG. 5A-1. Continuing, block 508 is executed and the screens displayed on the CRT 14 are examined in reverse order and the pertinent logical button information is pushed onto a stack. For example, referring again to FIG. 4, the screen numbers given in the tester window 410 are 3, 7, 4, and 5. The first logical child's information popped off the stack should be the first logical child in screen 3. Therefore, when pushing onto the stack, the tester tool <T> examines the last screen first, which is screen 5. In addition, the children are inspected in reverse order for the same reason. The determination of logical children is performed by seeing if the "entry" slot value for a child is "y". If the child is a logical child, then it may have multiple functions like the Flex Bar, mentioned already previously with respect to the builder tool <B>, and each function must be tested individually for the normal and auxiliary branching modes. Therefore, for each function there are typically two stack entries.

In summary, the construction of the stack for a CRT screen 14 may seem somewhat complex, but the entire process is readily implemented because a screen array index value gives at the ith location where to find the first child of the ith screen. This means that the loop searching for children within a screen is straightforward. Then, once a child is found, there are arrays within the array of structure that hold all the various function information.

Continuing, block 510 is executed next. The top stack item is popped off the stack. In the FIG. 4 example, the first item retrieved is the logical button information for the single button 211-1 labeled as "Pizzas". Next, block 512 is executed and the stack information is formatted and sent to a NICE popup window that can place text within the window via NICE commands. After the tester window 410 is displayed, either at the bottom left-hand corner or the top left-hand corner (or elsewhere), a program delay occurs to allow the window to appear for a few seconds. Then, block 514 is executed to allow the tester tool <T>to be terminated. The implementation of block 514 is accomplished by determining whether or not a digit key is depressed. If it is, then an event is sent to the tester tool <T> by the Windows operating environment. Continuing, if the result of the inquiry at block 514 is "yes", then a branch to connector E in FIG. 6B is made and the program ends. If the result of the inquiry is "no", then block 516 is executed.

If the result of the inquiry of block 516 is "yes", then the program is to be paused. The implementation of this inquiry is accomplished by determining whether or not the space bar is pressed. If it is, then the program is paused. The program is resumed when the space bar is pressed again. Continuing, if the result of block 516's inquiry is "yes", then block 518 is executed. If the result of the block 518 inquiry is "no", then the pausing of the program continues, and block 518 is executed again. If the result of the block 518 inquiry is "yes", then a branch is made to block 514 to see if the program is now to be exited. Finally, if the result of the inquiry of block 516 is "no", then a branch is made to connector C in FIG. 6B where the testing continues.

The FIG. 6B flowchart is normally encountered when the branch to C is made from FIG. 6A. Also, a branch can be made to E from FIG. 6A when the program is to be aborted. Continuing, when a branch is made to C, block 520 is executed and the tester window is removed by sending the Windows environment a conventional message based on the tester window handle. Next, block 522 is executed. If the result of the inquiry of block 522 is "yes", then the stack is empty and the program exits normally since the entire interface has been tested. If the result of the inquiry of block 522 is "no", then the stack is not empty. Therefore, a branch is made to block 526 and logical button testing continues. When block 526 is executed, logical button information is popped from the stack just like was performed in block 510. Next, block 528 is executed. If the result of the inquiry of block 528 is "yes", then the CRT screen is the same as the current CRT screen and a branch is made back to B in FIG. 6A to again start the process of displaying the next tester window 410. If the result of the inquiry is "no", then block 530 is executed. If the result of the inquiry of block 530 is "yes", then blocks 532 through 534 are executed and one or more screens from the current CRT are removed and then one or more screen are added. The destroyed and created screens are with respect to normal branching. If the result of the block 530 inquiry is "no", then blocks 536 through 538 are executed. These are similar to blocks 532 and 534 except the branching mode is auxiliary. Again, the implementation of these is performed using the child's create and destroy slots discussed earlier.

Continuing, once the CRT 14 is updated, block 540 is executed. If the result of the inquiry of block 540 is "yes", meaning one or more of the screens appearing on the CRT 14 are displayed for the first time, then a branch is made to A in FIG. 6A to push the new logical button information onto the stack before the testing continues. If the result of the inquiry of block 540 is "no", then the CRT is not the same as the previous one, but the screens on the current CRT have already been tested or are in the process of being tested. That is, there are no new logical buttons to be tested. Therefore, the current CRT is displayed for a few seconds and then blocks 542 through 544 are executed before a branch is made back to D to obtain more tester information. Recapping, the execution of block 542 results in all the CRT screen objects being removed. Then, the execution of block 544 displays the CRT screens that correspond to the next stack item that will be popped. The determination of this CRT display is easily done by adding a "view" stack operator which can look at the next item without popping the item.

This concludes the teaching of the tester tool <T> component of the present invention, except for one additional remark. If in either blocks 534 or 538 a screen can not be displayed because it does not exist, then a popup window may be used to give the user an error message. By hitting any key, the testing is then continued.

3. The Run-Time System

The run-time system (hereinafter also referred to as <R>) of the present invention will now be described. Referring to FIGS. 7A through FIG. 7G, the run-time system's <R> execution starts at block 600 and continues to block 602 where the runtime initialization work begins. Specifically, at block 602, a 640×480 base window is created that has a white background. Various NICE controls or child windows will later be placed on top of this window as the various interface screens are created. Also, the base window handle is used for receiving all Windows environment messages. Next, as part of block 602's execution, an event message is sent to the run-time system <R> that results in more initialization work being performed. For example, the printer 38 and cash drawer 40 and any other peripherals are initialized. In addition, the NICE controls are activated, and boolean "blackboard" variables are set to FALSE indicating that none of the names in the "blackboard.dat" file are yet in use.

Continuing, block 604 is executed and the two "autopos" interface files are opened. This time, in contrast to what was performed by the builder tool <B> and the tester tool <T>, the supporting files are not needed, so they are not opened. Next, block 606 is executed and the two interface files are read. As the "autopos.frm" records are read, the respective screen children are stored in an array of structure in sequential order. As each new screen is found, the location of its first child in the array of structure is stored in the next element of the "iScreensIndex" array. In addition, as "blackboard" slots are encountered, the corresponding location of the child in the array of structure is kept in a "blackboard" array for future use. In this way, the symbolic names are resolved at runtime and not at compile time.

Once the interface is read into memory, block 608 is executed. The implementation for this block may be performed by sending the Windows environment another event message. It is instructive to notice that block 608 is marked by the connector A. The reason for this is that the logic is performed each time the Touch Screen display 32 is altered. The effect of executing block 608 is that the array "iScreensActive" is initialized with the screens that comprise the current display. This information initially comes from the first line of the "autopos.frm" file as mentioned earlier. Also, the "iActivePtr" variable marks the location of the last active element in the "iScreensActive" array. The variable "iStartNewScreen" gives the location within the "iScreensActive" array of where the first of the new screen numbers reside. Initially, this value will mark the first active element in the "iScreensActive" array.

For a more detailed understanding of the steps described in the previous paragraph, reference is made back to the display of FIG. 2A. Suppose, the "Beer" button 221-8 is pressed. Then, a new "Drinks" screen is created, but the rest of the screens remain as is. Therefore, the "iStartNewScreen" value will be the same value as in "iActivePtr", since the new screen numbers come after the existing screen numbers in the "iScreensActive" array.

Finally, in block 608 the loop variable "i" is initialized to the value of "iStartNewScreen". This enables a loop to be executed, where each iteration results in another group of screen children being displayed on the Touch Screen 32.

Figure 7A:
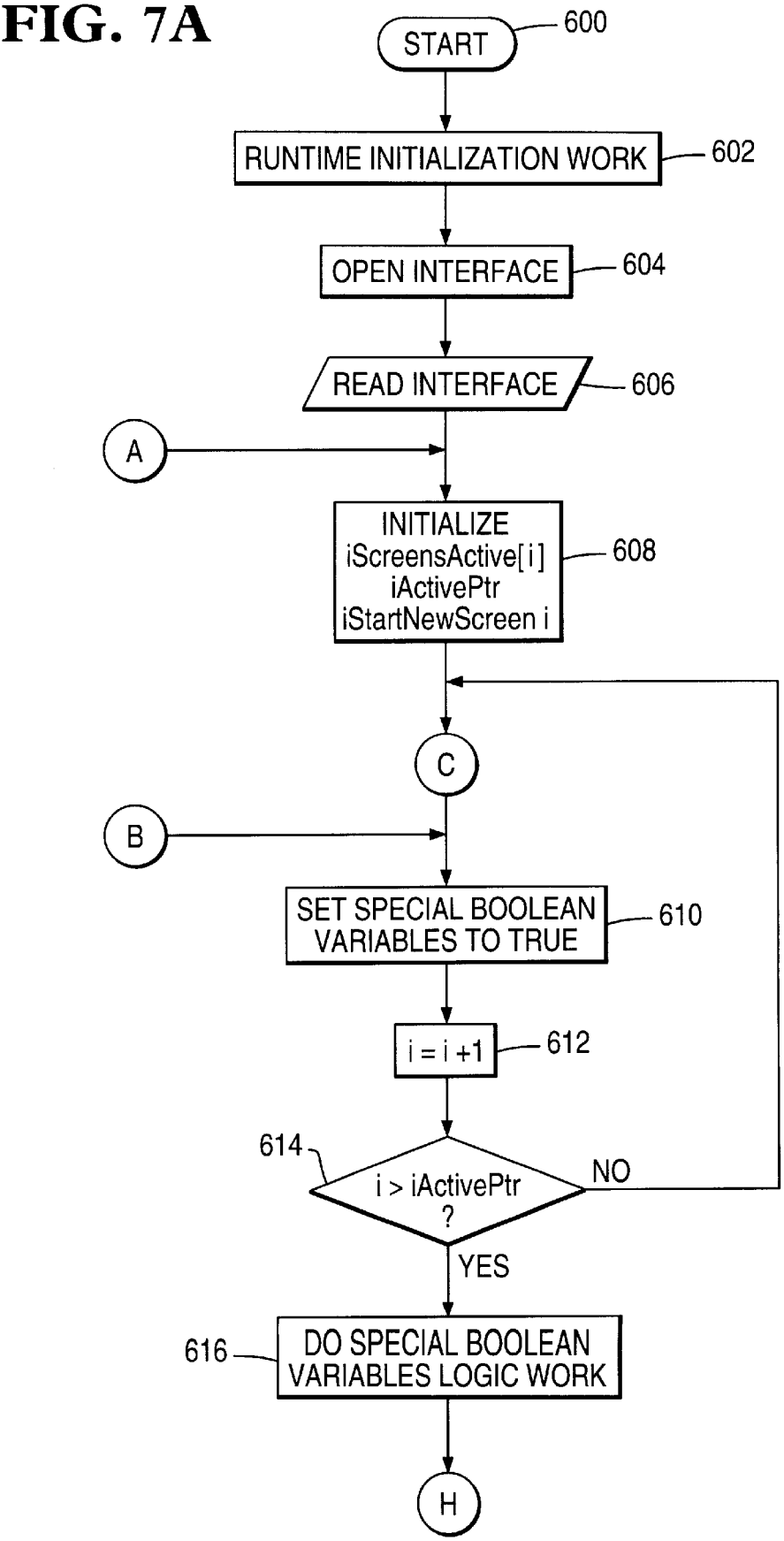
FIGS. 7A–7G are flowcharts depicting the steps that may be performed when integrating a touch screen interface into a runtime system.
Figure 7B:
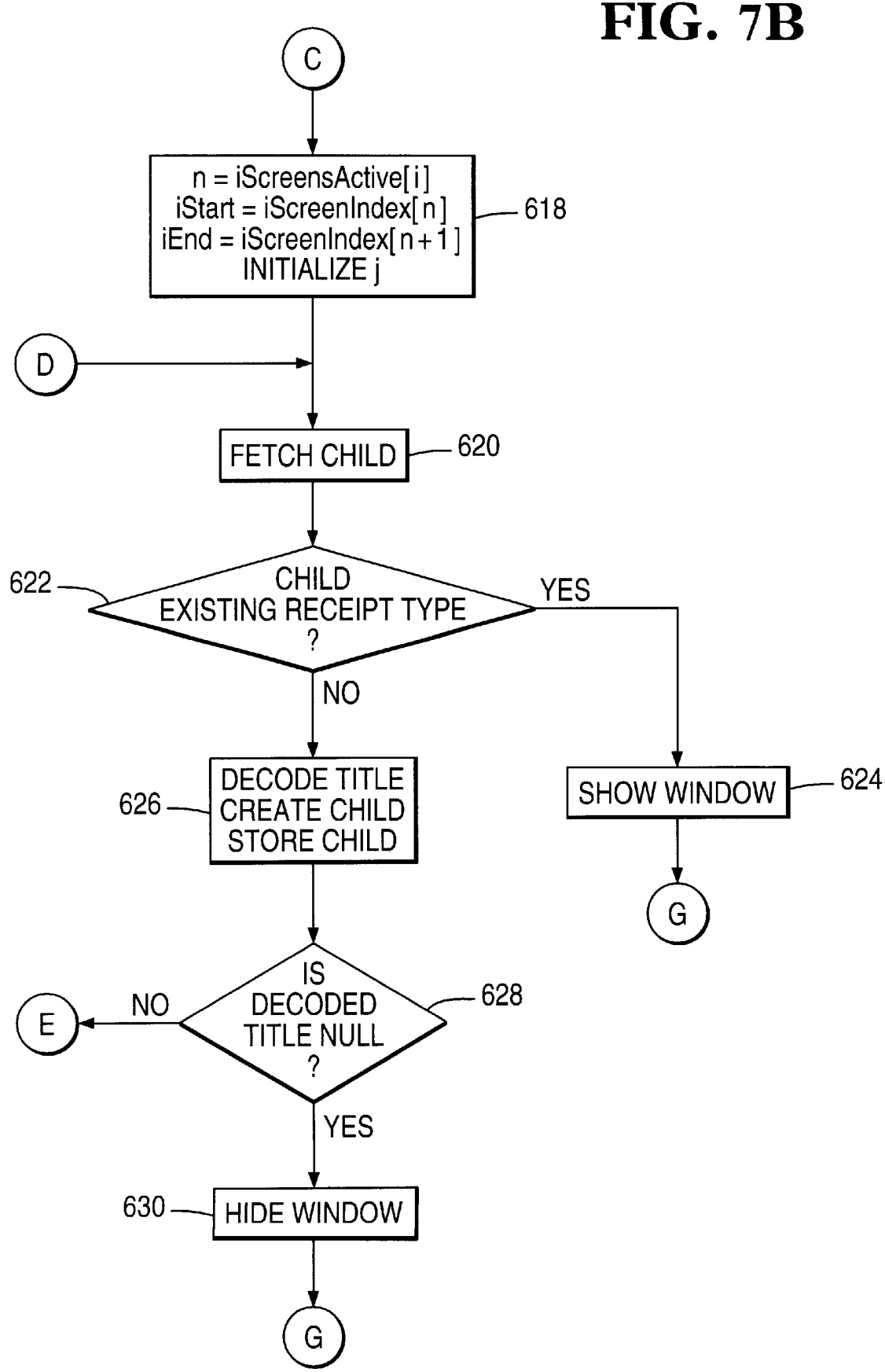

After block 608, connector C is encountered and all the steps involved in creating one new screen within the Touch Screen display are begun in FIG. 7B. This will be described in further detail later. Next, block 610 is executed and special boolean variables are set to TRUE depending on the screen number just made active. For example, referring again to the Touch Screen display in FIG. 2A, notice the six buttons (241-1 through 241-6) in the lower right-hand corner. The availability of these buttons is context-sensitive, based upon the receipt contents and the first time the associated screen is created. Therefore, if any of these buttons is displayed as part of a screen creation, then the respective blackboard variables can be used to set the corresponding screen boolean variable to the value of TRUE. In short, at block 610 certain boolean "blackboard" variables are set to TRUE. Some of these variables may be in every run-time system <R> implementation, and others may be related to a specific run-time system <R> implementation.

Continuing, block 612 is executed and the variable "i" is incremented by 1. Block 614 is executed next and an inquiry is performed to see if all the new screens have been displayed on the Touch Screen. If the result of the inquiry is "no", then a branch is made back to connector C where the steps to create the next screen are provided. If the result of the inquiry is "yes", then the special boolean variable logic is executed. For example, initially the "Modify Item" button 241-2 in the display in FIG. 2A is disabled after it is created because the receipt will then be empty. Therefore, block 616 is coded as a group of function calls with the guard for each function being whether a special boolean variable is TRUE or not. Again, some of these functions turn out to be general-purpose, but others are domain dependent. Continuing, after block 616 is executed a branch is made to connector H in FIG. 7E.

Figure 7C:
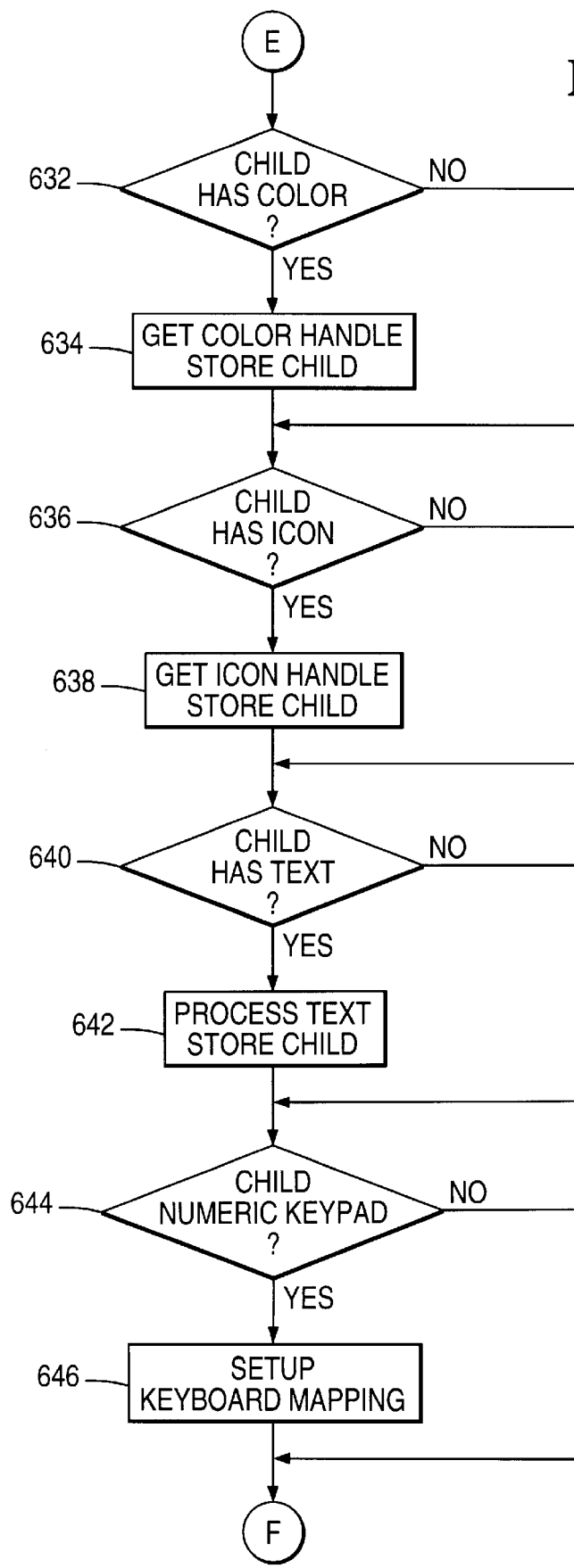
Figure 7D:
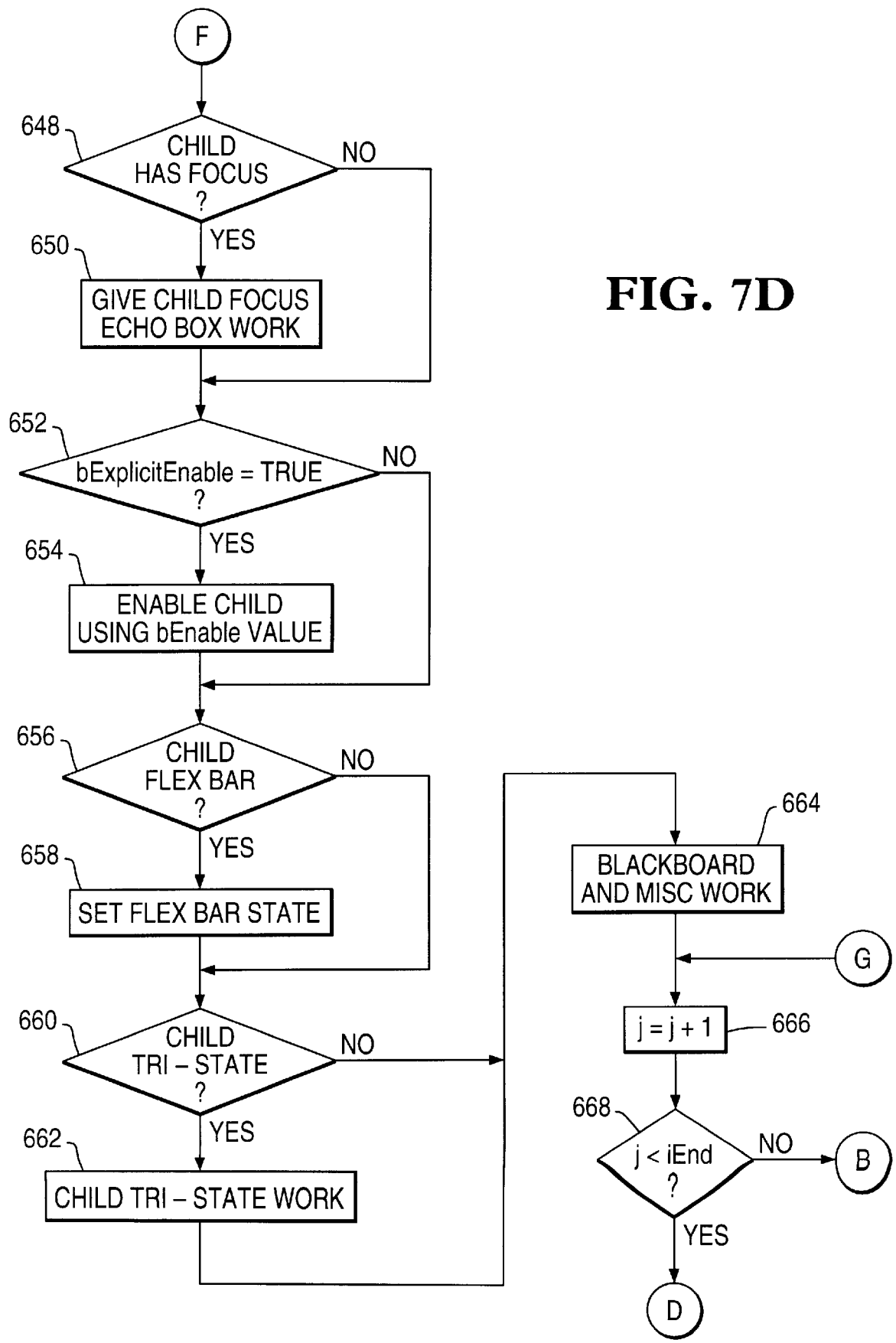
Figure 7E:
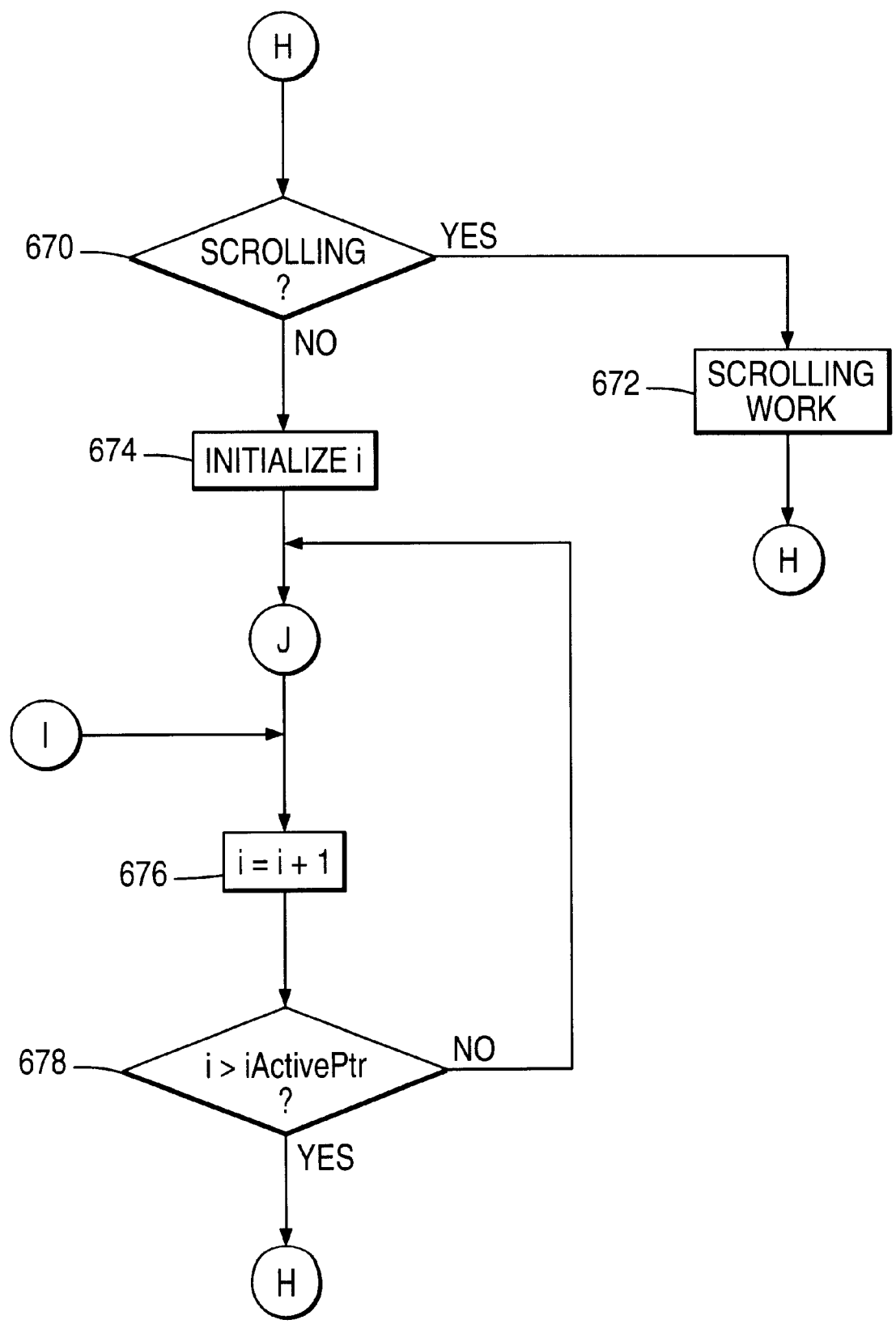

Referring now to FIG. 7E, the purpose of this flowchart is to show the steps needed to process a control touch event. Once a branch is made to H, then block 670 is executed. If the result of the inquiry of block 670 is "yes", then receipt scrolling has been performed. To see how this works, refer back to the Touch Screen display in FIG. 2A. Notice, in the upper right-hand corner that there are two arrows 231-1 and 231-2 appearing within the receipt. These arrows 231-1 and 231-2 can be touched to effect receipt scrolling, either up or down. When this happens, NICE scrolls automatically by highlighting another receipt item, sends the run-time system <R> an event message, and the message is processed when block 672 is executed. For example, in FIG. 2A the six buttons 241-1 through 241-6 must be activated or deactivated each time a new receipt item is highlighted. Once the scrolling side-effect work is completed, then a branch is made back to H to await more runtime system <R> Touch Screen events.

Figure 7F:
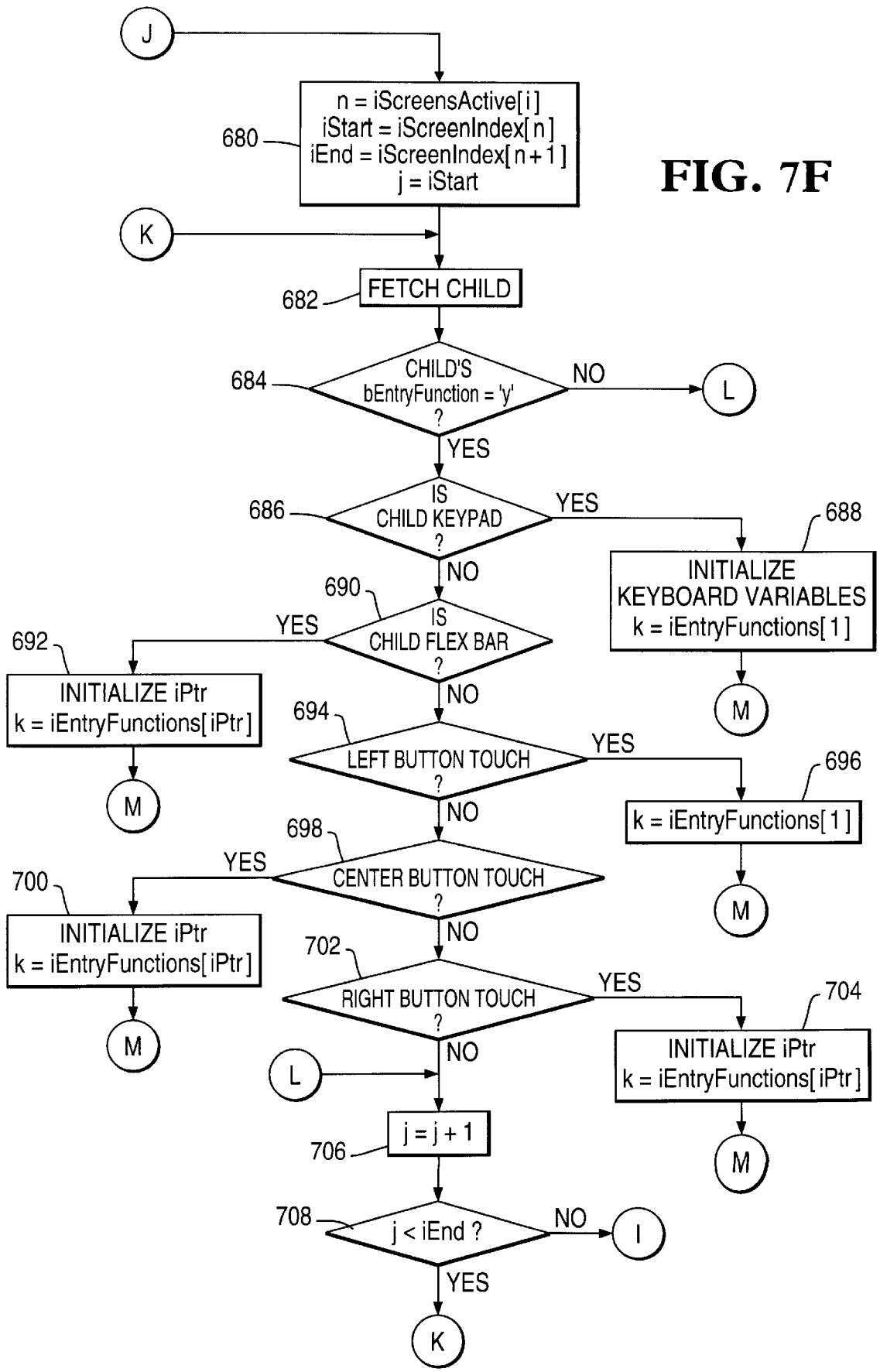

Referring again to block 670, if the result of this inquiry is "no", then block 674 is executed. Here the loop variable "i" is initialized. The purpose of the subsequent loop is to examine each active screen and see if one of its logical buttons has been touched. Continuing, the connector J in FIG. 7F is encountered next. The purpose of the FIG. 7F flowchart is to provide the steps needed to first locate a logical button, given a specific screen, and then to execute its ELL function. This will be described in further detail later.

Now, assume that the logical button exists on another screen. Then, block 676 is executed and the loop variable "i" is incremented by 1. Next, block 678 is executed and an inquiry is performed to see if "i" is greater than "iActivePtr". If the result of the inquiry is "no", meaning more active screens have to be searched, then a branch is made back to J to repeat the search using the next active screen. If the result of the inquiry is "yes", then a branch is made back to H to wait for more relevant R events, since the current event is not a logical Touch Screen event.

There are now two remaining tasks in the present teaching of the run-time system <R>. The first task is to use FIGS. 7F and 7G to show how to do the following: find the logical button that has been touched, access and execute the correct ELL function, and perform the subsequent destroy-and-create screen work. The second task is to use FIGS. 7B through 7D to show the steps needed for creating a screen's children.

Referring now to FIG. 7F, connector J is branched to when a Touch Screen event has been detected by the run-time system <R>, and when the ith element in "iScreensActive" array is to be used to see if this screen number contains the logical button that was just touched. Continuing, block 680 is executed and the variable "n" is set to the screen number to be examined. Also, the search range within the array of structure is found by assigning the variables "iStart" and "iEnd" to "iScreenIndex[n]" and "iScreenIndex[n+1]" respectively. Then, the loop variable "j" is initialized to the value in "iStart". Block 682 is executed next and is marked with the connector K, since it is the start of the child search loop. At block 682 the jth child is fetched from the array of structure and placed in a single structure. The reason for this is to make the coding less complex, especially if the interface is so large that several arrays of structures are needed in order to avoid data segment limitations.

Next, block 684 is executed. If the result of this inquiry is "no", then no ELL function is associated with the NICE object and a branch is made to connector L at block 706. When block 706 is executed, the loop variable "j" is incremented by 1 so the next child in the present screen can be inspected. Next, block 708 is executed. If the result of the inquiry of block 684 is "yes", meaning j is less than "iEnd", a branch is made back to K at block 682 so the child search loop can be continued. If the result of the inquiry at block 708 is "no", then a branch is made back to connector I in FIG. 7E so the screen search loop can be continued.

Referring again back to block 684, if the result of the inquiry is "yes", then a logical button has been found and block 686 is executed. If the result of the inquiry of block 686 is "yes", then a NICE numeric keypad control is the current child touched, and a branch is made to block 688. When block 688 is executed, keyboard variable initialization is performed and "k" is assigned the child's "iEntryFunctions[1]" value. This is because the keypad control can be viewed as a single button control. Also, recall that the value in "k" will be the relative location of the ELL function in the "keylogic.dat" file. Continuing, a branch is then made to M in FIG. 7G. This flowchart gives the button's general-purpose logic steps, once the ELL function number is known, and will be explained later.

If the result of the block 686 inquiry is "no", then block 690 is executed. If the result of the inquiry of block 690 is "yes", then a Flex Bar control has been touched. For example, referring to the Touch Screen display in FIG. 2B, if the "$1.00" button is the tender desired, then the third button 263 in this horizontal Flex Bar is touched. Continuing, block 692 is executed next. The "iPtr" variable is initialized by examining one of the current event message parameters. Then, the "k" is initialized to "iEntryFunction[iPtr]" to get the correct ELL relative number. Finally, a branch is made to M as before.

If the result of the inquiry at block 690 is "no", then block 694 is executed. If the result of the inquiry of block 694 is "yes", then the left button of a multiple-button control, other than the Flex Bar, has been touched and block 696 is executed. At block 696, "k" is initialized to "iEntryFunctions[1]", as this is where the left button ELL function number is stored. And as before, a branch is then made to M.

Figure 2C:
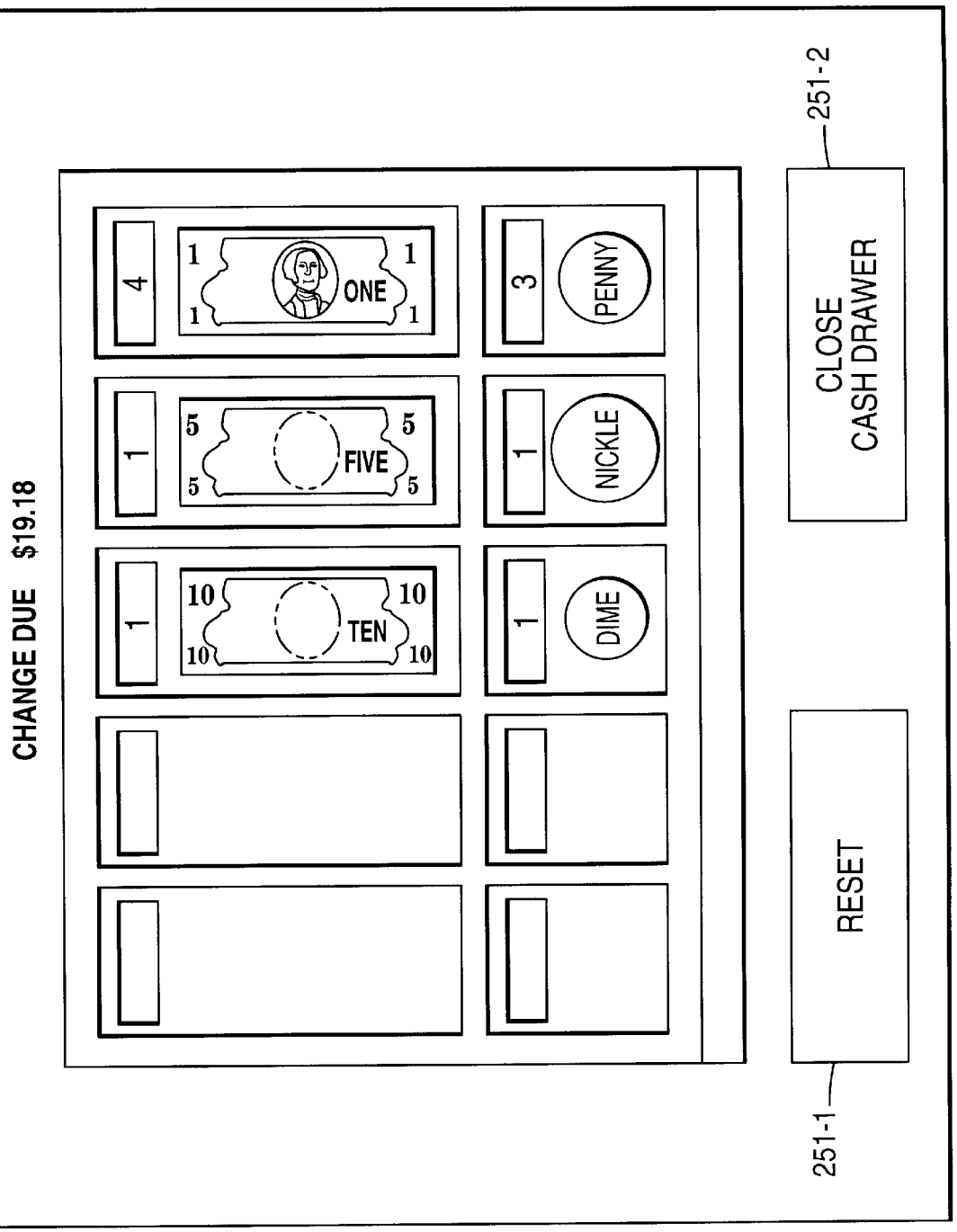

If the result of the inquiry at block 694 is "no", then block 698 is executed. If the result of the inquiry of block 698 is "yes", then the center button of a NICE control has been touched. Block 700 is executed next, and "iPtr" is initialized. The value is dependent on the particular kind of control. For example, in the Touch Screen display in FIG. 2D, the middle section 232-1B of the "Pepperoni" button 232-1 is highlighted and this is the second of three touch positions (232-1A, 232-1B and 232-1C). However, when the "Reset" button 251-1 in the Touch Screen display of FIG. 2C is touched, then a center button touch is detected, but this time the ELL function is in the first element of "iEntryFunctions". The second step in block 700 assigns "k" its proper value. Next, a branch is made to M as before.

If the result of the inquiry at block 698 is "no", then block 702 is executed. If the result of this inquiry is "yes", then block 704 is executed and "iPtr" is given its proper value, "k" is given its value, and a branch is made to M. The initialization logic in block 704 is needed to distinguish between whether a two or three logical button control has been touched. This is because the corresponding ELL function number will be stored in a different location within "iEntryFunctions".

If the result of the inquiry at block 702 is "no", then the Touch Screen event is not a pertinent one, and the next child on the screen must be inspected. This logic, beginning at block 706, has already been discussed.

Figure 7G:
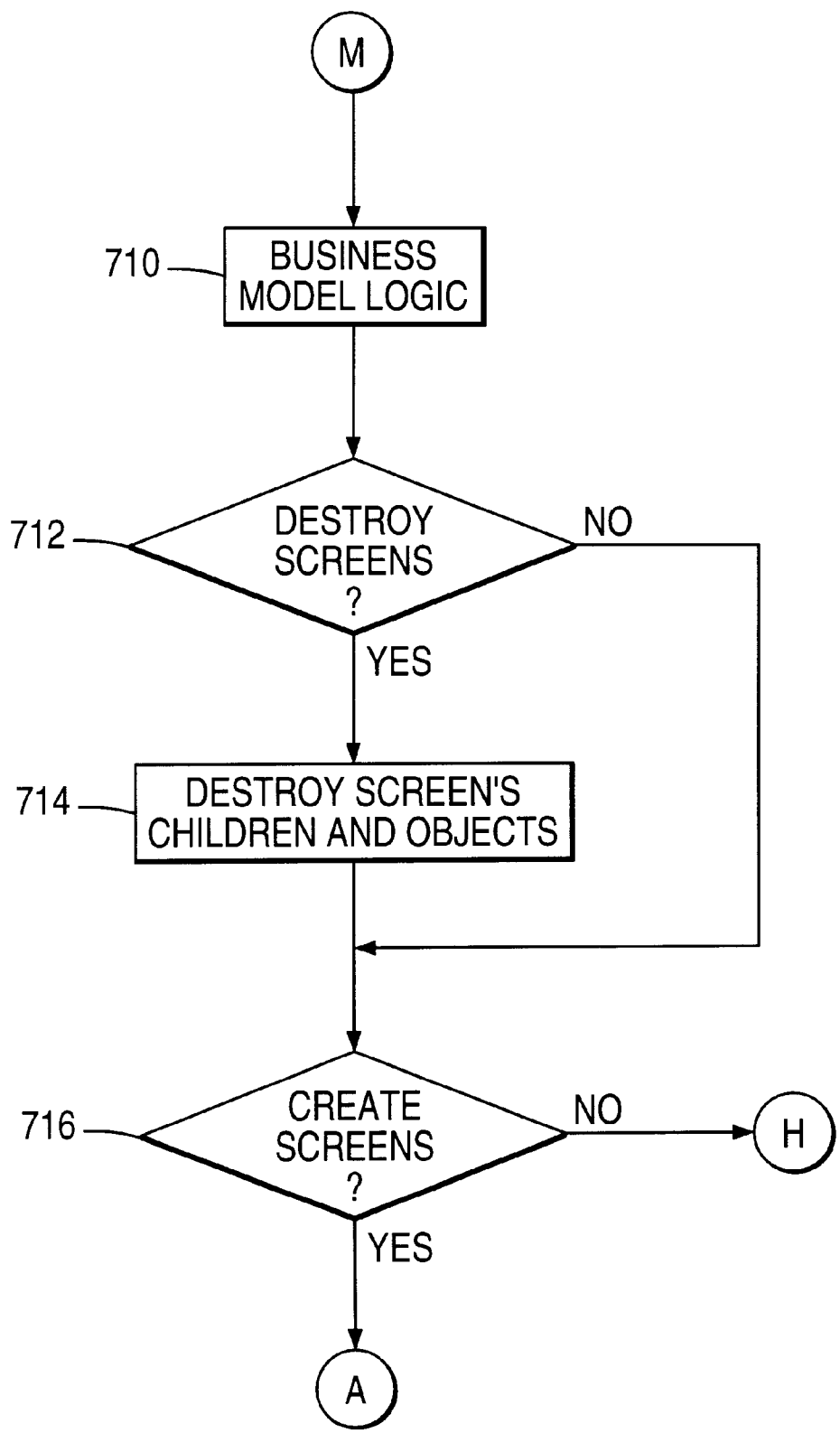

Referring now to FIG. 7G, recall that connector M is where a branch is made when the ELL relative function number has been found for a control that has just been touched. Continuing, block 710 is executed and the ELL function is invoked that corresponds to the business model incorporated into the run-time system <R>. The ELL function work begins by calling the "Business_Model" function with the ELL relative number as the argument. Then, the proper ELL function is executed by using the following C line of code:

"bStatus=Bridges[iFunction]( );"

The reason this invocation works is that the ELL functions are coded in alphabetical order following the "Business_Model" function and because an ".h" file defines "Bridges" as follows:

int(*Bridges[NUM_FUNCTIONS])(void)={. . .};

In the above statement, NUM_FUNCTIONS is given a value via a "#define" statement and the three dots are replaced with the ELL function names separated by commas. The generation of the ".h" file and the ".c" file are done automatically by using a program that uses the "keylogic.dat" file as input. Then, the skeleton ".c" file containing the ELL functions is modified as the specific ELL logic is added. As development takes place, the "keylogic.dat" file is modified with new ELL functions and some of the existing ones are deleted. To automate this process, the following sequence of steps are performed. First, the new names are added to the end of the "keylogic.dat" file and a relative number of −1 is typed to the right of the name and the comma. Second, the relative number of those to be deleted is changed to −2. Then, the file is sorted in alphabetical order. Next, the builder tool <B> (described previously) is invoked and its files are saved. As a result, both the interface and the "keylogic.dat" files are updated. Third, a program is run that updates the ".h" and ".c" files to delete the old ELL functions and to add the skeleton new ELL functions. Finally, the new ELL functions are modified to reflect the business model.

After block 710 is executed, then block 712 is executed. If the result of the inquiry of block 712 is "no", then block 714 is skipped. If the result of the inquiry is "yes", then block 714 is executed. The screens to be deleted are identified as part of the ELL function logic. Therefore, in block 714 the deletion process requires cycling through the children of a screen, deleting the children from the Touch Screen display, destroying the various children handles, and updating the "iScreensActive" array and its associated variables. Next, block 716 is executed. If the result of the inquiry of block 716 is "no", then no new screens are added to the current display and a branch is made to H in FIG. 7E to await more Touch Screen events. If the result of the inquiry is "yes", then a branch is made back to A in FIG. 7A.

Referring now to FIG. 7B, this is the first flowchart accessed when the children of a particular screen are to be created. Block 618 is executed first and "n" is given the screen number to be created, "iStart" is assigned the location within the array of structure where the first child information is stored, "iEnd" is the location of one beyond the last screen child, and "j" is initialized to the value in "iStart". Block 620 is executed next and the child information is moved from the array of structure to a single structure for the reasons given earlier. Continuing, block 622 is executed. If the result of the inquiry of block 622 is "yes", then the child to be created is a "receipt" control that already exists, but it is invisible. Therefore, a branch is made to block 624 and the child is made visible.

To understand more fully why this is performed, refer back to the first Touch Screen display in FIG. 2A. Suppose several items are ordered and then the right part of the button 211-2 labeled as "Special Pepperoni" is touched. Then, the next Touch Screen displayed is the one in FIG. 2D. Once the "OK" or "Cancel" buttons are pressed a return is made to the first Touch Screen. Therefore, it is desirable at this time to not have to create a new "receipt" control and then re-send all the purchases to the control. After block 624 is executed, a branch is made to connector G in FIG. 7D to prepare for the next screen child. This part of the flowchart will be explained later.

Referring back to block 622, if the result of this inquiry is "no", then block 626 is executed. The first task is to decode the title text using the mathematical composite function approach, where f of g is defined as f(g(x)). The g(x) work is performed by having x denote the text number and then retrieving this text from the "autopos.dat" file which is stored in an array. Next, the text string is sent to a decoding function to obtain f(g(x)). Generally, the result will be the same as g(x). But for variable text situations, the text string will be changed. The decoding for variable text relies on the following abstraction: "::n:". Here, "n" is an integer. To see how this works, refer back to the Touch Screen display in FIG. 2B.

In FIG. 2B, the 6-button (261 through 266) horizontal "Flex Bar" has variable text, as the tender amounts will not always be the same. In addition, given certain balance dues, sometimes some of the buttons will be inactive given the human interface tendering algorithms. To overcome these difficulties, the button labels are all defined with variable text. Then, the decoding will change the label based on the program context. If the button is to be hidden, then the text label is changed to the string "MT".

Once the title decoding in block 626 is completed, then the child can be created using a common Windows environment command and some of the child's slot information along with the object class name that appears at the end of the "begin_screen" statement. Specifically, in FIG. 3A through FIG. 3C, the slots for each interface representation (1301, 1302, 1303, etc.) up to and including the "windows" slot (e.g., 1301-2, 1302-3, etc.) are used excluding the "icon" and "blackboard" slots. Then, the child's handle is obtained and the final step in block 626 is to store the child in its array of structure. In effect, this changes the child's handle variable to a non-negative integer. Next, block 628 is executed. If the result of the inquiry of block 628 is "yes", meaning the title text is "MT", then block 630 is executed and the child window is made invisible. Then, a branch is made to G in FIG. 7D since the new child work is completed. If the result of the inquiry is "no", then a branch is made to E in FIG. 7C.

Now FIG. 7C will be explained. The purpose of FIG. 7C is to perform post child creation work. Block 632 is executed first. If the result of the inquiry of block 632 is "yes", block 634 is executed using the child's "color" slot information and a common Windows command. A color handle is returned, and the child information is stored in the array of structure. If the result of the block 632 inquiry is "no", then the color work is bypassed. Continuing, block 636 is executed. If the result of the inquiry is "yes", then the "icon" slot information is used with the appropriate NICE and Windows command to place the icon on the face of the control. Again, an icon handle is obtained and the child information is stored in the array of structure. If the result of the block 636 inquiry is "no", then block 638 is skipped. Continuing, block 640 is executed next. If the result of the inquiry of block 640 is "yes", then block 642 is executed and the text for the "Reply Box" is processed using the child's "font", "text", "justify", and "line" slots and Windows and NICE commands. The "text" is coded as a number, the "justify" information is coded for left, center, and right justification, and the "line" gives the relative line number within the "Reply Box". The "font" is optional because each control has default information in the "NL_CD.INI" file.

Continuing, if the inquiry at block 640 is "no", then block 642 is bypassed. Next, block 644 is executed. If the result of the inquiry of block 644 is "yes", then a NICE numeric keypad is the current child type, and block 646 is executed. This results in a Windows message being sent to the child to prepare it for functioning as a numeric keypad. If the result of the inquiry is "no", then block 646 is bypassed. A branch is then made to connector F in FIG. 7D to continue the post child creation work.

The purpose of FIG. 7D is to conclude the work associated with creating a new child. Execution begins at block 648. If the result of the inquiry is "yes", then the child is to be given focus. Block 650 is executed and the "Edit Box" is given focus using a basic Windows command. If the result of the inquiry is "no", then block 650 is bypassed. Next, block 652 is executed. If the result of the inquiry is "yes", then the "EnableWindow" Windows command is to be invoked. To see why this is necessary, refer back to the display in FIG. 2A. Notice, in the upper left-hand corner the background with the "Pizza" text (211). This control should not be active, since other controls are place on top of it. Therefore, after it is created it is disabled. The text is not dimmed because the Windows control panel setting has been changed to give this text as it is shown. In short, the "explicit_enable" slot, when used, has a value of either "y" or "n". Then, at block 654 this value is used in conjunction with the "EnableWindow" command and the "enable" slot value to send the child a message of TRUE or FALSE as the situation may dictate.

Figure 2D:
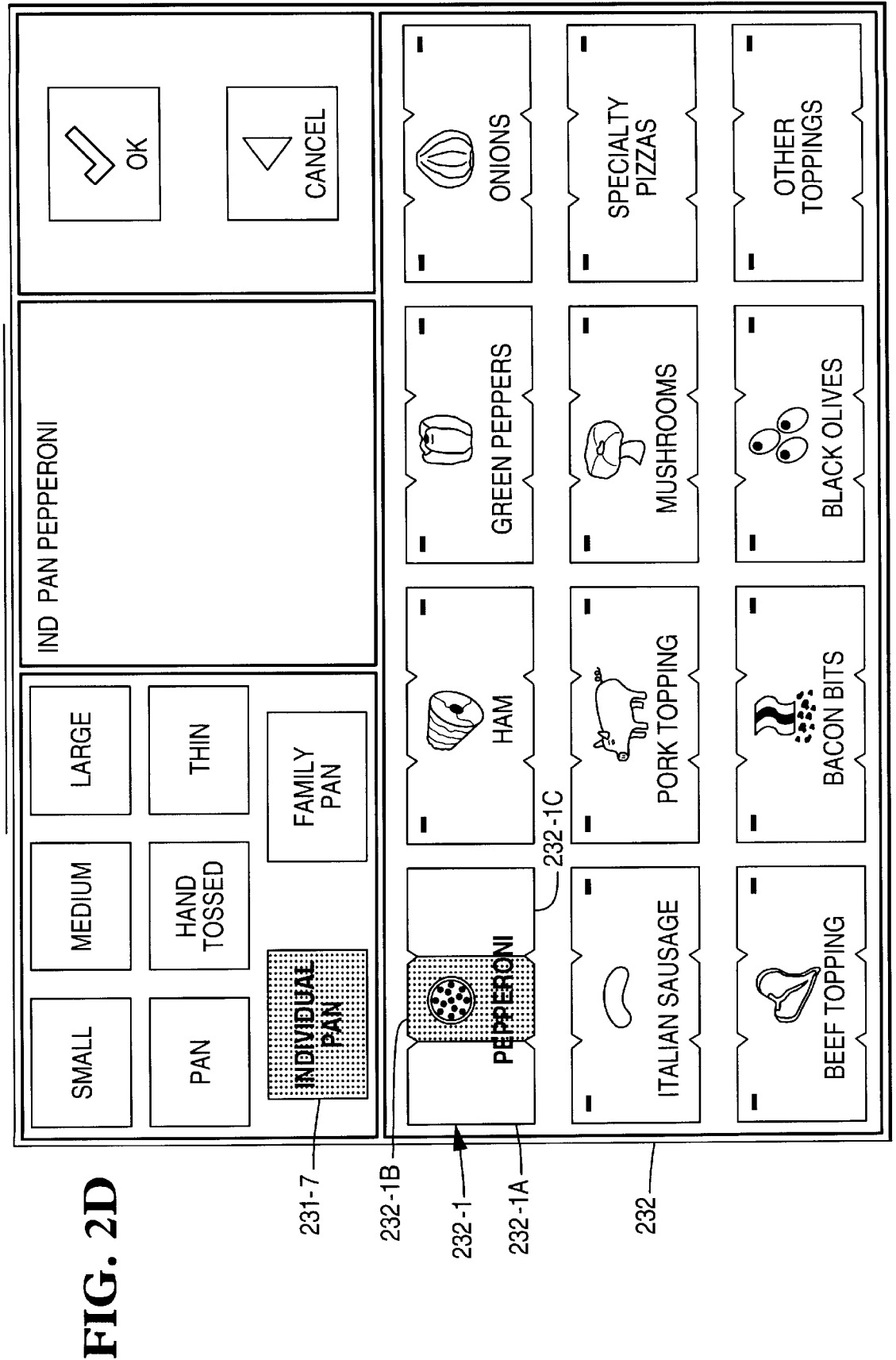

Continuing, if the result of the inquiry at block 652 is "no", then block 654 is skipped. Next, block 656 is executed. If the result of the inquiry of block 656 is "yes", then a "Flex Bar" object has been created and some initial work needs to be performed. Therefore, block 658 is executed next. The reason initial work needs to be performed is illustrated in FIG. 2D, where the "Individual Pan" button 231-7, that is part of a horizontal "Flex Bar", is highlighted when the screen is first created. If the result of the inquiry at block 656 is "no", then block 658 is bypassed. Next, block 660 is executed. If the result of the inquiry of block 660 is "yes", meaning the control is a 3-state button, then block 662 is executed. This causes the tri-state initial logic to be done. For example, referring again to FIG. 2D, notice the "Pepperoni" button 232-1 with its middle portion highlighted. This is performed when the screen is first created and is accomplished as a part of block 662. If the result of the block 660 inquiry is "no", then block 662 is skipped.

Next, block 664 is executed. This is implemented by having a call to a function which checks various "blackboard" slot names and then perform specific logic. For example, if the "Modify Item" button 241-2 in FIG. 2A is created, then the "blackboard" slot match enables the screen "blackboard" variable to be set to TRUE. This concludes the post child creation work for a particular child.

Continuing, block 666 is executed and the child variable pointer "j" is incremented by 1. Next, block 668 is executed. If the result of the inquiry of block 668 is "yes", meaning more screen children must be created, then a branch is made back to D in FIG. 7B to resume this work. If the result of the inquiry is "no", meaning all the screen children have been created, then a branch is made to B in FIG. 7A to continue creating the next new screen or to conclude the screen construction.

While the invention has been described in detail with specific reference to preferred embodiments thereof, it is understood that variations and modifications thereof may be made without departing from the spirit and scope of the invention.

What is claimed is:

1. A method for constructing a graphical touch screen user interface for use with a run-time application, comprising the steps of:
    (a) building a graphical touch screen user interface comprising a plurality of touch screen displays, each touch screen display comprising a plurality of objects representing controls whose data, code, identification information, branching information, and Entry Level Logic (ELL) function name corresponding to an ELL function are external to a run-time application, by receiving commands from a user to group the objects into screen units which can be created, destroyed and re-created when invoked by the runtime application, wherein the building step further comprises the step of assigning a constant or variable text string to a label for an object using a mathematical composite function $f(g(x))$, where x represents a text string number and $g(x)$ represents a corresponding text string in a stored file corresponding to that text string number, and where $f(g(x))$ represents a further text string which is assigned from a plurality of other possible text strings;
    (b) testing the graphical touch screen user interface on a video display prior to integrating the graphical touch screen user interface into the run-time application by automatically testing each of the objects in each touch screen display that has functional attributes as if the controls were physically touched beginning with a first touch screen display;
    (c) storing information representing the graphical touch screen user interface in memory for invocation by the run-time application; and
    (d) integrating the graphical touch screen user interface into the run-time application.

2. The method of claim 1, wherein the step of building comprises a sub-step selected from the group consisting of (i) assigning constant or variable text to an object; (ii) designating a particular object as a control to the run-time application to allow for special processing; (iii) placing an icon on a particular object; (iv) highlighting a part of an object; (v) assigning single or multiple functions to an object; and (vi) deleting and creating screen units as the run-time application executes.

3. The method of claim 1, wherein the building step comprises assigning to some of the plurality of objects multi-functional controls.

4. The method of claim 1, wherein the building step comprises assigning to an object a control such that the object changes state when invoked by the run-time application to being visible, invisible, disabled or enabled.

5. The method of claim 1, wherein the building step comprises the step of assigning branching information for each object, wherein the branching information is one of at least four types selected from the group consisting of (i) the creation of one or more primary screen units, (ii) the destruction of one or more primary screen units, (iii) the creation of one or more auxiliary screen units, and (iv) the destruction of one or more auxiliary screen units.

6. A method for constructing a graphical touch screen user interface for use with a run-time application, comprising the steps of:
    (a) building a graphical touch screen user interface comprising a plurality of touch screen displays, each touch screen display comprising a plurality of objects representing controls whose data, code, identification information, branching information, and Entry Level Logic (ELL) function name corresponding to an ELL function are external to a run-time application, by receiving commands from a user to group the objects into screen units which can be created, destroyed and re-created when invoked by the run-time application, wherein the building step further comprises the steps of:
- (i) storing in an ELL external file an ELL function number corresponding to the ELL function name for each ELL function, where an ELL function number corresponds to a relative location of the ELL function name within the ELL external file; and
- (ii) arranging the ELL functions in the ELL external file in alphabetical order by ELL function name, whereby at run-time, an ELL function is invoked with a single executable instruction that calls a function with an ELL function number;

(b) testing the graphical touch screen user interface on a video display prior to integrating the graphical touch screen user interface into the run-time application by automatically testing each of the objects in each touch screen display that has functional attributes as if the controls were physically touched, beginning with a first touch screen display;

(c) storing information representing the graphical touch screen user interface in memory for invocation by the run-time application; and (d) integrating the graphical touch screen user interface into the run-time application.

7. The method of claim 6, wherein the step of building further comprises the steps of modifying the graphical touch screen user interface by adding or deleting an ELL function name for each new or modified object, and automatically renumbering the ELL function numbers in the ELL external file to account for the new or modified objects.

8. A method for constructing a graphical touch screen user interface for use with a run-time application, comprising the steps of:
- (a) building a graphical touch screen user interface comprising a plurality of touch screen displays, each touch screen display comprising a plurality of objects representing controls whose data, code, identification information branching, information, and Entry Level Logic (ELL) function name corresponding to an ELL function are external to a run-time application, by receiving commands from a user to group the objects into screen units which can be created, destroyed and re-created when invoked by the run-time application, wherein the building step further comprises the steps of:
  - (i) assigning for each object a begin-end child pair of code lines between which are slot lines that contain control information for the object;
  - (ii) arranging controls for a touch screen unit between a begin-end screen pair;
  - (iii) sequentially numbering screen-pairs for each touch screen display; and
  - (iv) storing a list of screen numbers for screen units for an initial touch screen display;
- (b) testing the graphical touch screen user interface on a video display prior to integrating the graphical touch screen user interface into the run-time application by automatically testing each of the objects in each touch screen display that has functional attributes as if the controls were physically touched, beginning with a first touch screen display;
- (c) storing information representing the graphical touch screen user interface in memory for invocation by the run-time application; and
- (d) integrating the graphical touch screen user interface into the run-time application.

9. A method for constructing a graphical touch screen user interface for use with a run-time application, comprising the steps of:
- (a) building a graphical touch screen user interface comprising a plurality of touch screen displays, each touch screen display comprising a plurality of objects representing controls whose data, code, identification information, branching information, and Entry Level Logic (ELL) function name corresponding to an ELL function are external to a run-time application, by receiving commands from a user to group the objects into screen units which can be created, destroyed and re-created when invoked by the run-time application;
- (b) testing the graphical touch screen user interface on a video display prior to integrating the graphical touch screen user interface into the run-time application by automatically testing each of the objects in each touch screen display that has functional attributes as if the controls were physically touched, beginning with a first touch screen display, wherein the testing step further comprises steps of:
  - (i) displaying a tester window superimposed in each touch screen display without covering an object under test;
  - (ii) displaying in the tester window a list of screen numbers that define the plurality of screens units that make up each touch screen display, and for each functional object, displaying a text label for the object, a corresponding ELL function name, a branching type, and screen numbers for the screen units to be destroyed and the screen units to be created following invocation of the ELL function corresponding to the object under test;
  - (iii) executing the displaying step for each functional object in each of a plurality of touch screen displays that make up the graphical touch screen user interface; and
  - (iv) displaying an error message in the tester window in the event that a screen unit is not available for creation or deletion in response to execution of an object;
- (c) storing information representing the graphical touch screen user interface in memory for invocation by the run-time application; and
- (d) integrating the graphical touch screen user interface into the run-time application.

10. The method of claim 9, and further comprising the step of starting, pausing or terminating the testing steps in response to user commands.

11. The method of claim 9, wherein the displaying step (i) comprises displaying in order the screen numbers for the screen units that make up a touch screen display.

12. A system for constructing a graphical touch screen user interface for use with a run-time application, comprising:
- storage means for storing a run-time application and a collection of objects representing controls whose data, code, identification information, branching information, and Entry Level Logic (ELL) function name corresponding to an ELL function are external to the run-time application;
- video display means for displaying information;
- input means for generating input signals corresponding to selected objects; and processor means coupled to the storage means and to the video display means for:

(a) building a graphical touch screen user interface comprising a plurality of touch screen displays, each touch screen display comprising a plurality of objects stored in the storage means, by receiving commands from a user to group the objects into screen units that can be created, destroyed and re-created when invoked by the run-time application, and assigning a constant or variable text string to a label for an object using a mathematical composite function f(g(x)), where x represents a text string number and g(x) represents a corresponding text string in a stored file corresponding to that text string number, and where f(g(x)) represents a further text string which is assigned from a plurality of other possible text strings;

(b) testing the graphical touch screen user interface on a video display prior to integrating the graphical touch screen user interface into the run-time application by automatically testing each of the objects in each touch screen display that has functional attributes as if the controls were physically touched, beginning with a first touch screen display;

(c) storing information representing the graphical touch screen user interface in the storage means for invocation by the run-time application; and (d) integrating the graphical touch screen user interface into the run-time application.

13. The system of claim 12, wherein the processor means builds the graphical touch screen user interface by performing a sub-step selected from the group consisting of (i) assigning constant or variable text to an object; (ii) designating a particular object as a control to the run-time application to allow for special processing; (iii) placing an icon on a particular object; (iv) highlighting a part of an object; (v) assigning single or multiple functions to an object; and (vi) deleting and creating screen units as the run-time application executes.

14. The system of claim 12, wherein the processor means builds the graphical touch screen user interface by assigning to some of the plurality of objects multi-functional controls.

15. The system of claim 12, wherein the processor means builds the graphical touch screen user interface by assigning to an object a control such that the object changes state when invoked by the run-time application to being visible, invisible, disabled or enabled.

16. The system of claim 12, wherein the processor means builds the graphical user interface by assigning branching information for each object, wherein the branching information is one of at least four types selected from the group consisting of (i) the creation of one or more primary screen units, (ii) the destruction of one or more primary screen units, (iii) the creation of one or more auxiliary screen units, and (iv) the destruction of one or more auxiliary screen units.

17. A system for constructing a graphical touch screen user interface for use with a run-time application, comprising:

storage means for storing a run-time application and a collection of objects representing controls whose data, code, identification information, branching information, and Entry Level Logic (ELL) function name corresponding to an ELL function are external to the run-time application;

video display means for displaying information;

input means for generating input signals corresponding to selected objects; and processor means coupled to the storage means and to the video display means for:

(a) building a graphical touch screen user interface comprising a plurality of touch screen displays, each touch screen display comprising a plurality of objects stored in the storage means, by receiving commands from a user to group the objects into screen units that can be created, destroyed and re-created when invoked by the run-time application, and further:

(i) storing in an ELL external file an ELL function number corresponding to the ELL function name for each ELL function, where an ELL function number corresponds to a relative location of the ELL function name within the ELL external file; and (ii) arranging the ELL functions in the ELL external file in alphabetical order by ELL function name, whereby at run-time, an ELL function is invoked with a single executable instruction that calls a function with an ELL function number;

(b) testing the graphical touch screen user interface on a video display prior to integrating the graphical touch screen user interface into the run-time application by automatically testing each of the objects in each touch screen display that has functional attributes as if the controls were physically touched, beginning with a first touch screen display;

(c) storing information representing the graphical touch screen user interface in the storage means for invocation by the run-time application; and (d) integrating the graphical touch screen user interface into the run-time application.

18. The system of claim 17, wherein the processor means builds the graphical touch screen user interface by further:

modifying the graphical touch screen user interface by adding or deleting an ELL function name for each new or modified object; and automatically renumbering the ELL function numbers in the ELL external file to account for the new or modified objects.

19. A system for constructing a graphical touch screen user interface for use with a run-time application, comprising:

storage means for storing a run-time application and a collection of objects representing controls whose data, code, identification information, branching information, and Entry Level Logic (ELL) function name corresponding to an ELL function are external to the run-time application;

video display means for displaying information;

input means for generating input signals corresponding to selected objects; and processor means coupled to the storage means and to the video display means for:

(a) building a graphical touch screen user interface comprising a plurality of touch screen displays, each touch screen display comprising a plurality of objects stored in the storage means, by receiving commands from a user to group the objects into screen units that can be created, destroyed and re-created when invoked by the run-time application, and further:

(i) assigning for each object a begin-end child pair of code lines between which are slot lines that contain control information for the object;

(ii) arranging controls for a touch screen unit between a begin-end screen pair;
(iii) sequentially numbering screen-pairs for each touch screen display; and
(iv) storing a list of screen numbers for screen units for an initial touch screen display;

(b) testing the graphical touch screen user interface on a video display prior to integrating the graphical touch screen user interface into the run-time application by automatically testing each of the objects in each touch screen display that has functional attributes as if the controls were physically touched, beginning with a first touch screen display;

(c) storing information representing the graphical touch screen user interface in the storage means for invocation by the run-time application; and (d) integrating the graphical touch screen user interface into the run-time application.

20. A system for constructing a graphical touch screen user interface for use with a run-time application, comprising:

storage means for storing a run-time application and a collection of objects representing controls whose data, code, identification information, branching information, and Entry Level Logic (ELL) function name corresponding to an ELL function are external to the run-time application;

video display means for displaying information;

input means for generating input signals corresponding to selected objects; and processor means coupled to the storage means and to the video display means for:
(a) building a graphical touch screen user interface comprising a plurality of touch screen displays, each touch screen display comprising a plurality of objects stored in the storage means, by receiving commands from a user to group the objects into screen units that can be created, destroyed and re-created when invoked by the run-time application;

(b) testing the graphical touch screen user interface on a video display prior to integrating the graphical touch screen user interface into the run-time application by automatically testing each of the objects in each touch screen display that has functional attributes as if the controls were physically touched, beginning with a first touch screen display, and further:
(i) displaying a tester window superimposed in each touch screen display without covering an object under test;
(ii) displaying in the tester window a list of screen numbers that define the plurality of screens units that make up each touch screen display, and for each functional object, displaying a text label for the object, a corresponding ELL function name, a branching type, and screen numbers for the screen units to be destroyed and the screen units to be created following invocation of the ELL function corresponding to the object under test;
(iii) executing the displaying step for each functional object in each of a plurality of touch screen displays that make up the graphical touch screen user interface; and
(iv) displaying an error message in the tester window in the event that a screen unit is not available for creation or deletion in response to execution of an object;

(c) storing information representing the graphical touch screen user interface in the storage means for invocation by the run-time application; and (d) integrating the graphical touch screen user interface into the run-time application.

21. The system of claim 20, wherein the processor means displays in order in the tester window the screen numbers for the screen units that make up a touch screen display.

* * * * *

UNITED STATES PATENT AND TRADEMARK OFFICE
CERTIFICATE OF CORRECTION

PATENT NO. : 6,002,395
DATED : December 14, 1999
INVENTOR(S) : Samuel J. Wagner et al.

It is certified that error appears in the above-indentified patent and that said Letters Patent is hereby corrected as shown below:

Column 27, line 43, after "mation" insert --,--.

Column 27, line 43, after "branching" delete ",".

Signed and Sealed this

Tenth Day of April, 2001

*Attest:*

NICHOLAS P. GODICI

*Attesting Officer*     *Acting Director of the United States Patent and Trademark Office*